US011051650B2

(12) United States Patent
Apone et al.

(10) Patent No.: US 11,051,650 B2
(45) Date of Patent: Jul. 6, 2021

(54) BEVERAGE DISPENSING SYSTEMS AND METHODS

(71) Applicant: Starbucks Corporation, Seattle, WA (US)

(72) Inventors: Dan Apone, Seattle, WA (US); Izaak Koller, Seattle, WA (US); Michael Cummer, Seattle, WA (US); William George Crossland, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 16/435,289

(22) Filed: Jun. 7, 2019

(65) Prior Publication Data
US 2020/0000274 A1 Jan. 2, 2020

Related U.S. Application Data

(60) Continuation of application No. 16/369,818, filed on Mar. 29, 2019, which is a division of application No.
(Continued)

(51) Int. Cl.
A47J 31/44 (2006.01)
A47J 31/46 (2006.01)
(Continued)

(52) U.S. Cl.
CPC ............. A47J 31/4489 (2013.01); A23F 5/00 (2013.01); A23L 2/54 (2013.01); A47J 31/46 (2013.01);
(Continued)

(58) Field of Classification Search
CPC . A23F 5/00; A23L 2/54; A47J 31/4489; A47J 31/46; A47J 31/467; A47J 31/60;
(Continued)

(56) References Cited

U.S. PATENT DOCUMENTS 784,755 A 3/1905 Pein
1,460,094 A 6/1923 Peter
(Continued)

FOREIGN PATENT DOCUMENTS

BE 20145074 1/2016
CN 102551537 A 7/2012
(Continued)

OTHER PUBLICATIONS

Office Action in corresponding Chinese Patent Application No. 201680053847.3, dated Mar. 18, 2020, in 19 pages.
(Continued)

Primary Examiner — Vishal Pancholi
Assistant Examiner — Bob Zadeh
(74) Attorney, Agent, or Firm — Knobbe, Martens, Olson & Bear, LLP

(57) ABSTRACT

Various beverage preparation systems and methods are disclosed. The beverage preparation system can include a dispensing unit configured to receive beverage, such as a shot of espresso, from a beverage preparation machine. The dispensing unit can include a dispensing unit with a first end and a second end. The dispensing unit can be rotatable between an upright position and an inverted position. The dispensing unit can be configured to receive the beverage through the second end when the dispensing unit is in the upright position, and can be configured to receive cleansing fluid through the second end when the dispensing unit is in the inverted position. In some embodiments, when the dispensing unit is in an intermediate position between the upright and inverted positions, the dispensing unit is configured to dispense the beverage out of the first end and into a cup or other vessel.

21 Claims, 14 Drawing Sheets

Related U.S. Application Data

15/260,078, filed on Sep. 8, 2016, now Pat. No. 10,258,191.

(60) Provisional application No. 62/327,808, filed on Apr. 26, 2016, provisional application No. 62/220,680, filed on Sep. 18, 2015.

(51) Int. Cl.

| | |
|---|---|
| *A23L 2/54* | (2006.01) |
| *B67D 1/00* | (2006.01) |
| *B67D 1/07* | (2006.01) |
| *B67D 1/08* | (2006.01) |
| *A47J 31/60* | (2006.01) |
| *A47J 43/12* | (2006.01) |
| *B67D 3/00* | (2006.01) |
| *F16K 15/04* | (2006.01) |
| *F16K 15/14* | (2006.01) |
| *A23F 5/00* | (2006.01) |
| *B67D 1/16* | (2006.01) |

(52) U.S. Cl.
CPC ............ *A47J 31/467* (2013.01); *A47J 31/60* (2013.01); *A47J 43/125* (2013.01); *B67D 1/0005* (2013.01); *B67D 1/0009* (2013.01); *B67D 1/0017* (2013.01); *B67D 1/0081* (2013.01); *B67D 1/07* (2013.01); *B67D 1/0805* (2013.01); *B67D 3/0029* (2013.01); *B67D 3/0061* (2013.01); *F16K 15/044* (2013.01); *F16K 15/147* (2013.01); *B67D 1/0888* (2013.01); *B67D 1/0895* (2013.01); *B67D 1/16* (2013.01); *B67D 3/0051* (2013.01); *B67D 2210/00089* (2013.01)

(58) Field of Classification Search
CPC ... A47J 43/125; B67D 1/0005; B67D 1/0009; B67D 1/0017; B67D 1/0081; B67D 1/07; B67D 1/0805; B67D 1/0888; B67D 1/0895; B67D 1/16; B67D 2210/00089; B67D 3/0029; B67D 3/0051; B67D 3/0061; F16K 15/044; F16K 15/147
See application file for complete search history.

(56) References Cited

U.S. PATENT DOCUMENTS

| | | |
|---|---|---|
| 2,127,883 A | 8/1938 | Norton |
| 2,251,059 A | 7/1941 | Lau |
| 2,748,411 A | 6/1956 | Richard |
| 2,762,656 A | 9/1956 | Fraser |
| 3,045,926 A | 7/1962 | Steinen |
| 3,180,375 A | 4/1965 | Fechheimer |
| 3,345,933 A | 10/1967 | Ernesto |
| 3,920,149 A | 11/1975 | Fortino et al. |
| 3,987,715 A | 10/1976 | Muller |
| 4,316,727 A | 2/1982 | Hegemann et al. |
| 4,523,083 A | 6/1985 | Hamilton |
| 4,827,904 A | 5/1989 | Bonanno |
| 4,911,212 A | 3/1990 | Burton |
| 5,205,306 A | 4/1993 | Peterson |
| 5,299,433 A | 4/1994 | Harms et al. |
| 5,650,186 A | 7/1997 | Annoni et al. |
| 5,865,104 A | 2/1999 | Sham et al. |
| 6,019,032 A | 2/2000 | Arksey |
| 6,220,147 B1 | 4/2001 | Priley |
| 6,293,187 B1 | 9/2001 | Zils |
| 6,390,319 B1 | 5/2002 | Yu |
| 6,558,035 B2 | 5/2003 | Lane |
| 6,889,603 B2 | 5/2005 | Carhuff et al. |
| 7,121,287 B2 | 10/2006 | Carhuff et al. |
| 7,318,372 B2 | 1/2008 | Cooke |
| 8,356,461 B2 | 1/2013 | Cedrone |
| 8,474,367 B2 | 7/2013 | Morin et al. |
| 8,515,574 B2 | 8/2013 | Studor et al. |
| 8,763,655 B2 | 7/2014 | Springer |
| 8,777,182 B2 | 7/2014 | Springer |
| 8,899,281 B2 | 12/2014 | Russell |
| 8,941,455 B2 | 1/2015 | Alexander et al. |
| 8,960,079 B2 | 2/2015 | Gugerli et al. |
| 8,991,795 B2 | 3/2015 | Studor et al. |
| 9,222,714 B2 | 12/2015 | Zebuhr et al. |
| 9,301,635 B2 | 4/2016 | Stutz et al. |
| 9,398,821 B1 | 7/2016 | Long |
| 10,258,191 B2 | 4/2019 | Apone et al. |
| 10,362,896 B2 | 7/2019 | Apone et al. |
| 10,531,761 B2 | 1/2020 | Apone et al. |
| 2002/0023543 A1 | 2/2002 | Schmed |
| 2004/0173719 A1 | 9/2004 | Mitchell |
| 2005/0115419 A1 | 6/2005 | Oldani et al. |
| 2005/0145717 A1 | 7/2005 | Katz et al. |
| 2005/0174884 A1 | 8/2005 | Farrell |
| 2006/0140595 A1 | 6/2006 | Grabowski |
| 2007/0181003 A1 | 8/2007 | Bardazzi |
| 2007/0187421 A1 | 8/2007 | Constantine et al. |
| 2007/0209521 A1 | 9/2007 | Boussemart et al. |
| 2008/0169048 A1 | 7/2008 | Windmiller |
| 2008/0223478 A1 | 9/2008 | Hantsoo et al. |
| 2009/0057340 A1 | 3/2009 | Moothart |
| 2009/0266245 A1 | 10/2009 | Kanuma et al. |
| 2010/0047407 A1 | 2/2010 | Carbonini |
| 2010/0064899 A1 | 3/2010 | Aardenburg |
| 2010/0151092 A1 | 6/2010 | Sus et al. |
| 2010/0159097 A1 | 6/2010 | Boussemart et al. |
| 2010/0170838 A1 | 7/2010 | Falcone |
| 2010/0192785 A1 | 8/2010 | Krauchi et al. |
| 2010/0193528 A1 | 8/2010 | Davidson |
| 2010/0263545 A1 | 10/2010 | Morgan et al. |
| 2011/0048462 A1 | 3/2011 | Morin et al. |
| 2011/0061764 A1 | 3/2011 | Springer |
| 2011/0097465 A1* | 4/2011 | Bishop .................. A47J 31/32 426/431 |
| 2011/0121020 A1* | 5/2011 | Springer ............ A47G 19/2205 222/1 |
| 2011/0232501 A1 | 9/2011 | Kroesen et al. |
| 2011/0256287 A1 | 10/2011 | Sus et al. |
| 2012/0305111 A1 | 12/2012 | Peretti et al. |
| 2012/0305597 A1* | 12/2012 | Larzul .................. A47J 31/469 222/148 |
| 2013/0087050 A1 | 4/2013 | Studor et al. |
| 2013/0118639 A1 | 5/2013 | Springer |
| 2013/0213960 A1 | 8/2013 | Cook |
| 2013/0240079 A1 | 9/2013 | Petrini |
| 2014/0004241 A1* | 1/2014 | Hatherell .................. A23L 2/56 426/477 |
| 2014/0020566 A1 | 1/2014 | Stieger |
| 2014/0123858 A1 | 5/2014 | Rellis |
| 2014/0123859 A1 | 5/2014 | Verbeek |
| 2014/0166524 A1 | 6/2014 | Springer |
| 2014/0182744 A1 | 7/2014 | Shaffer |
| 2014/0263430 A1 | 9/2014 | Keating et al. |
| 2014/0264972 A1 | 9/2014 | Studor et al. |
| 2014/0283877 A1 | 9/2014 | Sonoda |
| 2014/0332113 A1 | 11/2014 | Springer |
| 2015/0104548 A1 | 4/2015 | Yip |
| 2015/0108169 A1 | 4/2015 | Bishel |
| 2015/0150408 A1 | 6/2015 | Schlee |
| 2015/0272382 A1 | 10/2015 | Truninger et al. |
| 2015/0284163 A1 | 10/2015 | Manwani et al. |
| 2015/0336736 A1 | 11/2015 | Cabilli |
| 2016/0045063 A1 | 2/2016 | Mantle et al. |
| 2016/0058238 A1 | 3/2016 | Purton |
| 2016/0235243 A1 | 8/2016 | Grassia et al. |
| 2016/0284153 A1 | 9/2016 | Tansey, Jr. et al. |
| 2017/0079464 A1 | 3/2017 | Apone et al. |
| 2017/0079468 A1 | 3/2017 | Apone et al. |
| 2017/0350645 A1 | 12/2017 | Dussault |
| 2017/0359996 A1 | 12/2017 | Adriaens |
| 2018/0098653 A1 | 4/2018 | Pinchuk |
| 2018/0160846 A1 | 6/2018 | Ceotto et al. |
| 2018/0213968 A1 | 8/2018 | Purton |

(56) References Cited

U.S. PATENT DOCUMENTS

| | | | |
|---|---|---|---|
| 2018/0344074 A1 | 12/2018 | Dussault et al. | |
| 2019/0223654 A1* | 7/2019 | Apone | A23F 5/00 |
| 2020/0121118 A1 | 4/2020 | Apone et al. | |

FOREIGN PATENT DOCUMENTS

| | | | |
|---|---|---|---|
| CN | 101980639 B | 4/2014 | |
| EP | 1955623 A1 | 8/2008 | |
| EP | 2272408 A1 | 1/2011 | |
| EP | 2353473 A1 | 8/2011 | |
| EP | 2353474 A1 | 8/2011 | |
| GB | 2476066 A | 6/2011 | |
| JP | H06-078852 A | 3/1994 | |
| JP | H07-100063 A | 4/1995 | |
| JP | 2003-070644 A | 3/2011 | |
| WO | WO 00/19875 A1 | 4/2000 | |
| WO | WO 2006/075322 A2 | 7/2006 | |
| WO | WO 2008/049162 A1 | 5/2008 | |
| WO | WO 2011/106259 A1 | 9/2011 | |
| WO | WO 2014/036697 A1 | 3/2014 | |
| WO | WO-2014036697 A1 * | 3/2014 | A47J 31/00 |
| WO | WO 2014/075833 A2 | 5/2014 | |
| WO | WO 2014/086915 A1 | 6/2014 | |
| WO | WO 2014/144358 A1 | 9/2014 | |
| WO | WO 2016/079680 A1 | 5/2016 | |
| WO | WO 2017/048637 A1 | 3/2017 | |
| WO | WO 2017/048639 A1 | 3/2017 | |

OTHER PUBLICATIONS

Office Action in corresponding European Patent Application No. 18206295.0, dated Apr. 23, 2020, in 4 pages.
Office Action in corresponding Colombian Patent Application No. NC2018/0003312, dated Apr. 17, 2019, in 14 pages.
Extended Search Report in corresponding European Patent Application No. 16847111.8, dated May 23, 2019, in 6 pages.
Partial Search Report in corresponding European Patent Application No. 18206295.0, dated Feb. 20, 2019, in 13 pages.
Extended Search Report in corresponding European Patent Application No. 18206295.0, dated Jun. 13, 2019, in 14 pages.
Invitation to Pay Additional Fees in corresponding International Patent Application No. PCT/US2016/051345, dated Oct. 31, 2016, in 2 pages.
International Search Report and Written Opinion in corresponding International Patent Application No. PCT/US2016/051345, dated Dec. 14, 2016, in 17 pages.
International Preliminary Report on Patentability in corresponding International Patent Application No. PCT/US2016/051345, dated Mar. 29, 2018, in 10 pages.
Office Action in corresponding Chinese Patent Application No. 201680053847.3, dated Jul. 8, 2019, in 14 pages.
Office Action in corresponding Indian Patent Application No. 201837007255, dated Dec. 18, 2020, in 6 pages.
Office Action in corresponding Japanese Patent Application No. 2018-514371, dated Sep. 15, 2020, in 7 pages.
Carlsen, Zachary, "Set Steam Wand to Stun: Automated Milk Frother," http:/sprudge.com/set-steam-wand-to-stun-automated-milk-frother-118451.html, Apr. 8, 2017, in 8 pages.
O2perfectfoam, "Hello I am the Smart Full-Automatic Frother for Bars & Baristas," Jan. 15, 2016, in 7 pages.
"Frothing by steam of Coffee machine and latte art," https://yichaosun.pixnet.net/blog/post/1444502, site visited May 25, 2020, in 5 pages.

* cited by examiner

BEVERAGE DISPENSING SYSTEMS AND METHODS

CROSS REFERENCE

This application is a continuation of U.S. patent application Ser. No. 16/369,818, filed Mar. 29, 2019, which is a divisional of U.S. Patent Application Ser. No. 15/260,078, filed Sep. 8, 2016, which claims the priority benefit under 35 U.S.C. § 119 of U.S. Patent Application No. 62/220,680, filed Sep. 18, 2015, and U.S. Patent Application No. 62/327,808, filed Apr. 26, 2016. The entirety of each of the aforementioned applications is hereby incorporated by reference herein.

BACKGROUND

Field

The present disclosure relates to systems and methods for dispensing beverages, such as systems and methods for dispensing servings of espresso.

Description of Certain Related Art

Espresso is a coffee beverage brewed by forcing steam or hot water through ground coffee. Espresso is typically of thicker consistency than drip coffee, having a higher amount of dissolved solids than drip coffee per relative volume, and a serving size that is usually measured in shots. When producing a serving of espresso (called a "shot"), ground coffee is subjected to high pressure in a beverage preparation machine. This transforms the ground coffee into a firm puck. Hot water is then forced through the puck to produce the espresso, which typically flows directly from the machine into a cup. The cup with the espresso is then removed from the machine for consumption, sale, etc.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION OF CERTAIN EMBODIMENTS

Various beverage dispensing systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Figure 1:
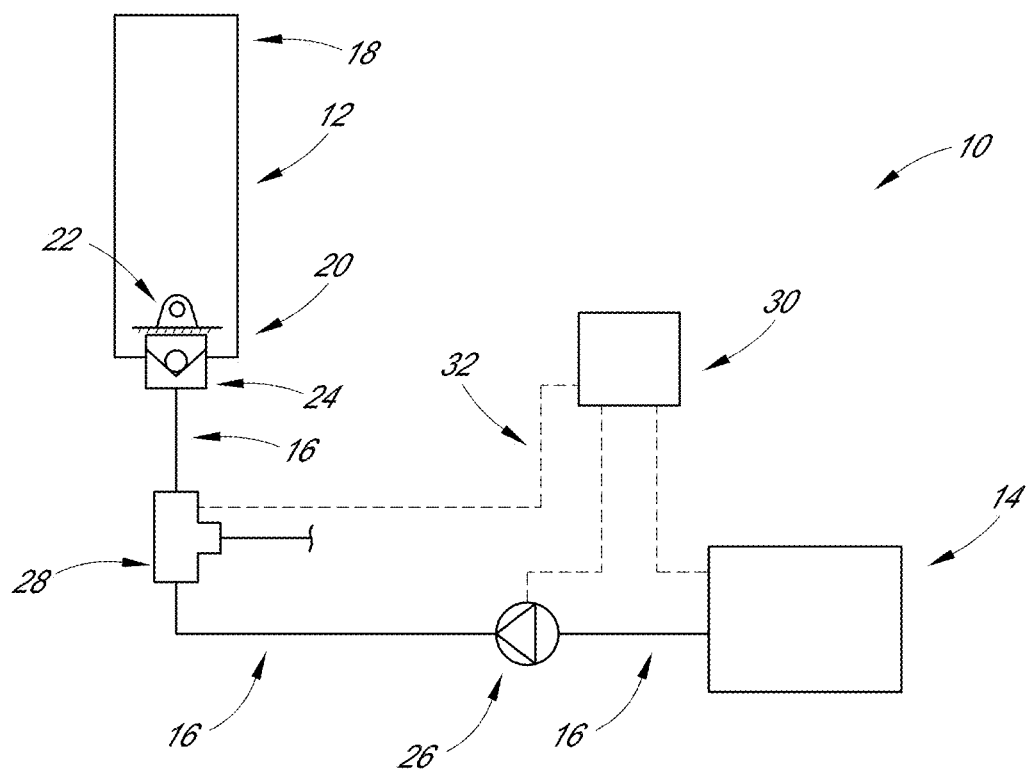
FIG. 1 schematically illustrates an embodiment of a beverage dispensing system.

Overview (FIG. 1)

FIG. 1 schematically illustrates an embodiment of a beverage dispensing system 10. To facilitate presentation, the system 10 is discussed in connection with dispensing an espresso beverage, such as a shot of espresso. But various embodiments can be applied in many other contexts as well, such as in dispensing brewed-coffee, tea, juice, alcohol, and other types of beverages.

As illustrated, the system 10 can include a dispensing unit 12 and a beverage preparation machine 14, such as a machine for preparing espresso. The dispensing unit 12 can be connected with tubing 16, such as flexible or rigid piping, to enable delivery of the beverage from the beverage preparation machine 14 to the dispensing unit 12. As shown, the dispensing unit 12 can be spaced apart from the beverage preparation machine 14. For example, the dispensing unit 12 can be positioned above a counter and/or generally visible from a front side and a rear side of the counter, and the beverage preparation machine 14 can be positioned below the counter, inside a cabinet, and/or otherwise generally obscured from view from at least one of the front and rear sides. In various embodiments, the dispensing unit 12 is not received in, part of, and/or coupled directly to the beverage preparation machine 14.

The dispensing unit 12 can receive the beverage from the beverage preparation machine 14 via a fluid communication path through the tubing 16. In some embodiments, the dispensing unit 12 is configured to hold and/or dispense the beverage. For example, the dispensing unit 12 can receive a shot of espresso, hold the espresso for a period, and dispense the espresso into a cup or other vessel. In certain implementations, the dispensing unit 12 is configured to contain a single serving of a beverage, such as a single shot of espresso. In some variants, the dispensing unit 12 is configured to contain multiple servings of a beverage.

In some embodiments, the dispensing unit 12 comprises a generally elongate hollow member. The dispensing unit 12 can be open on one end and closed on the other end. For example, the dispensing unit 12 can include a hollow tube that is open on a first end 18 and closed on a second end 20. In certain implementations, such as is schematically illustrated in FIG. 1, when the dispensing unit 12 is in an upright configuration, the first end 18 is the upper or uppermost end of the dispensing unit 12 and the second end 20 is the lower or lowermost end of the dispensing unit 12. In some embodiments, the dispensing unit 12 is transparent or semi-transparent. For example, the dispensing unit 12 can be made of transparent or semi-transparent plastic or glass.

As illustrated, the dispensing unit 12 can be configured to pivot about a rotation axis 22. For example, the dispensing unit 12 can be pivotally connected to a base or support member (not shown). As will be described in further detail below, such pivoting can enable the dispensing unit 12 to rotate between various operational states, such as dispensing the beverage from the dispensing unit 12 into a cup or other vessel. In the schematic shown, the rotation axis 22 is located at or near the second end 20 (e.g., bottom) of the dispensing unit 12. In some variants, the rotation point 22 is located at or near the first end 18 (e.g., top) of the dispensing unit 12. In certain implementations, the rotation point 22 is located between the first and second ends 18, 20, such as at or near the longitudinal mid-point of the dispensing unit 12. Certain embodiments are configured such that the dispensing unit 12 can rotate and can move laterally, such as in a side-to-side direction and/or a front-to-back direction on a countertop. In some embodiments, the dispensing unit 12 is connected with a linkage (not shown) that enables the dispensing unit 12 to traverse a curved trajectory. In some such embodiments, the dispensing unit 12 is able to invert (e.g., for dispensing and/or cleaning) but the path it takes is not a simple flip.

The system 10 can include one or more position sensors configured to detect the location of the dispensing unit 12. For example, the system 10 can detect when the dispensing unit 12 is in a receiving (e.g., upright) position, a dispensing position, and/or a cleaning (e.g., inverted) position. In some embodiments, the system 10 can determine whether the dispensing unit 12 is in a position to receive beverage from the beverage preparation machine 14 and/or to receive cleansing fluid from a source.

The system 10 can include a flow control device, such as a check valve 24. The check valve 24 can be located in the second end 20 of the dispensing unit 12. The check valve 24 can allow fluid to flow through the second end 20 and into the dispensing unit 12 and/or can inhibit or prevent fluid from passing out of the second end 20 of the dispensing unit 12. In certain implementations, the check valve 24 is configured to close in certain orientations of the dispensing unit 12. For example, the check valve 24 can close (e.g., due to the force of gravity acting on a movable sealing component of the check valve 24) when the dispensing unit 12 is in the upright configuration and there is less than a minimum amount of fluid pressure in the tubing 16. In certain embodiments, the check valve 24 is configured to removably couple with, and close, the second end 20 of the dispensing unit 12, as will be discussed in more detail below. In some implementations, the check valve 24 is a ball check valve, diaphragm valve, duckbill valve, or otherwise. In certain embodiments, the check valve 24 is rotatably connected with the tubing 16, such as with a rotatable coupling. This can allow the check valve 24 and the dispensing unit 12 to rotate relative to the tubing 16.

In some embodiments, the system 10 includes a pump 26, such as a peristaltic pump. The pump 26 can encourage the beverage from the beverage preparation machine 14 to the dispensing unit 12. Some embodiments do not include a pump 26. For example, in certain variants, pressure that occurs during the beverage preparation process (e.g., the pressure that occurs during the preparation of espresso) is used to encourage the beverage from the beverage preparation machine 14 to the dispensing unit 12 without the need for a pump 26.

As also illustrated, certain embodiments include a control valve 28, such as a three-way valve. The control valve 28 can be adapted to switch between a first position and a second position. In the first position, the control valve 28 can permit beverage to flow into the dispensing unit 12. In the second position, the control valve 28 can permit cleansing fluid (e.g., potable water) to flow into the dispensing unit 12. In some implementations, the flow of cleansing fluid flushes or otherwise cleanses some or all of the tubing 16, control valve 28, check valve 24, container 12, and/or other components of the system 10. In some implementations, the control valve 28 is an electronic valve, such as a solenoid valve.

As shown, certain embodiments include a controller 30, such as a processor and a memory. The controller 30 can be electrically coupled with various other components of the system 10, such as through one or more cables or wires 32. In some embodiment, the controller 130 communicates with one or more other components wirelessly, such as via wi-fi, Bluetooth®, etc. The controller 30 can control aspects of certain components of the system 10. For example, the controller 30 can control operation of the control valve 28 and/or pump 26. In some embodiments, the controller 30 can instruct the beverage preparation machine 14 to prepare a type of beverage, size of beverage, strength of beverage, etc. In some embodiments, the controller 30 and the beverage preparation machine 14 can communicate bi-directionally. For example, the controller 30 can send instructions to the beverage preparation machine 14 and can receive information from the beverage preparation machine 14, such as status information (e.g., number of espresso shots produced in a certain period, bean hopper status, etc.), health information (e.g., fault codes and/or descriptions), etc.

Certain Methods of Dispensing a Beverage (FIGS. 2A-2F)

FIGS. 2A-2F depict illustrative operational states of the beverage dispensing system 10. As will be described in more details, the system 10 can be configured to introduce beverage B through the bottom of the dispensing unit 12 when the unit 12 is in an upright configuration. Certain embodiments are configured to rotate, or to at least allow rotation of, the dispensing unit 12 to dispense the beverage contained in the dispensing unit 12 into a cup C or other vessel. Some embodiments are configured to introduce cleansing fluid through the top of the dispensing unit 12 when the unit is in an inverted configuration.

Figure 2A:
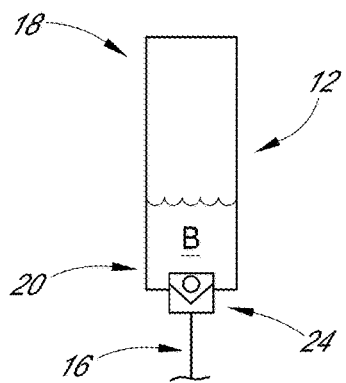
FIGS. 2A-2F illustrate portions of the beverage dispensing system of FIG. 1 in various operational states.

FIG. 2A illustrates an example of introducing the beverage B into the dispensing unit 12. In some embodiments, during the introduction operation, beverage from the beverage preparation machine 14 can flow through the tubing 16

(e.g., in response to the encouragement by the pump 26) and the control valve 28 can be toggled to allow the beverage to flow toward the dispensing unit 12. The flow of beverage can open the check valve 24, thereby allowing the beverage to flow into the dispensing unit 12.

As shown, the dispensing unit 12 can receive the beverage in the upright configuration (e.g., an orientation in which a longitudinal axis of the dispensing unit 12 is generally parallel with vertical). For example, the beverage can enter the dispensing unit 12 through the second end 20, which is the bottom end of the dispensing unit 12 in the upright configuration, and the first end 18 can be maintained higher than (e.g., directly above) the second end 20. In some implementations, the beverage is introduced into the dispensing unit 12 through a lower or lowermost portion of the dispensing unit 12. During the course of the beverage being introduced into the dispensing unit 12, the top surface of the beverage in the dispensing unit 12 can be seen to progress upwardly towards the top of the dispensing unit 12. This can provide a visual appearance of the beverage welling-up, growing, and/or rising within the dispensing unit 12. In some embodiments, introducing the beverage into the dispensing unit 12 while the dispensing unit 12 is in the upright configuration can allow the beverage to be maintained in the dispensing unit 12 for a period of time and/or for inspection activities to occur. For example, collecting the beverage in the upright dispensing unit 12 can allow for the beverage to be pre-made and ready for use at a later time, such as in response to a subsequent customer order. As another example, collecting the beverage in the upright dispensing unit 12 can allow inspection of beverage characteristics (e.g., color, opacity, foam, etc.), the total volume of the beverage, or other characteristics. In some variants, the beverage enters the dispensing unit 12 when the dispensing unit is in a non-upright configuration. For example, the beverage can be introduced into the dispensing unit 12 when the first end 18 is lower than the second end 20. This can allow the beverage to flow out of and/or be immediately be discharged from the dispensing unit 12.

Figure 2B:
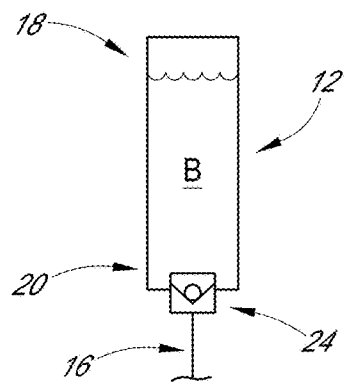

As shown in FIG. 2B, the dispensing unit 12 can be partially, substantially, or completely filled with the beverage. For example, in some embodiments, the dispensing unit 12 is substantially filled after receiving a volume that is equivalent to about a shot of espresso. In certain implementations, the beverage preparation machine 14 is configured to provide an amount of beverage that is less than, or substantially equal, to the volume of the dispensing unit 12. In some embodiments, after a certain amount of time has elapsed and/or a certain volume of beverage has been introduced into the dispensing unit 12, the flow of beverage ceases or decreases and/or the check valve 24 closes. For example, the controller 30 can instruct the beverage preparation machine 14 to stop preparation of the beverage. In some embodiments, the beverage can be maintained in the dispensing unit 12 for a period of time. This can allow modifications to the beverage in the dispensing unit 12. For example, additives can be introduced into the beverage held in the dispensing unit 12, such as sugar, flavoring (e.g., cinnamon, chocolate, vanilla extract, etc.), dairy products, ice, etc. Certain embodiments include a cap (e.g., a removable stopper) that can be used to close the first end 18 of the dispensing unit 12, so that the dispensing unit 12 can be shaken and/or pivoted to facilitate mixing.

Figure 2C:
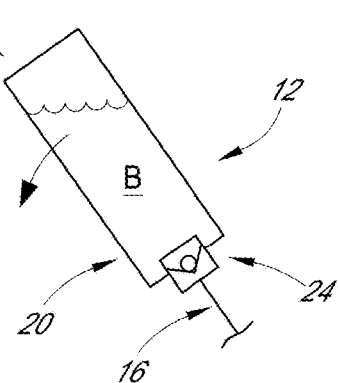
Figure 2D:
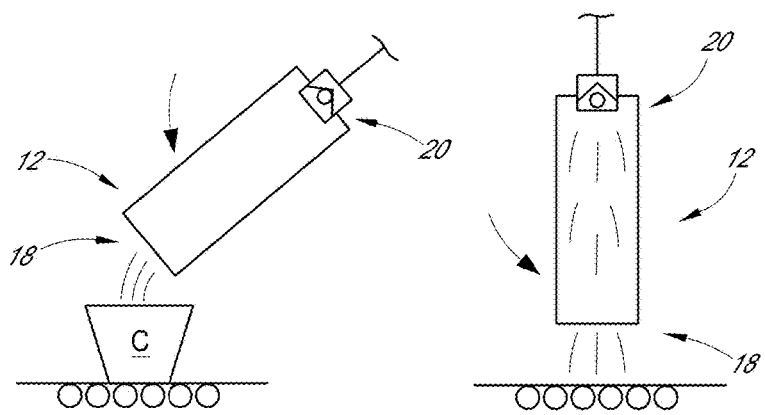

As mentioned above, the dispensing unit 12 can be rotated to facilitate pouring the beverage from the dispensing unit 12 into a cup C or other vessel. For example, as shown in FIGS. 2C and 2D, the dispensing unit 12 can be pivoted in a first direction about the rotation point 22, such as at least about: 90°, 120°, 150°, 170°, 180°, 190°, 210°, values between the aforementioned values, or otherwise. In some embodiments, the rotation point 22 is positioned at or near the lower or lowermost portion of the dispensing unit 12. In certain variants, the rotation point 22 is positioned at about the middle of the longitudinal length of the dispensing unit 12. Some embodiments pivot about an axis that is generally parallel with horizontal and/or that passes through the second end 20 of the dispensing unit 12. In various embodiments, the dispensing unit 12 is configured to pour beverage directly into the cup or other vessel, without intervening tubing 16 or other structures. As mentioned above, in certain implementations, the beverage can be introduced into the dispensing unit 12 when the first end 18 is lower than the second end 20. For example, the beverage can be introduced into the dispensing unit 12 in the position shown in FIG. 2D. The beverage can pour out immediately instead of collecting inside the dispensing unit 12.

In some embodiments, the system 10 includes a drain or catch basin, which can collect splashes and spills that occur during the course of pouring. The drain or catch basin can be covered with a grate, on which the cup or other vessel is placed to receive the beverage. The grate can include indicia (e.g., words or symbols) that indicate to a user where to position the cup or other vessel to receive the beverage from the dispensing unit 12.

Figure 2E:
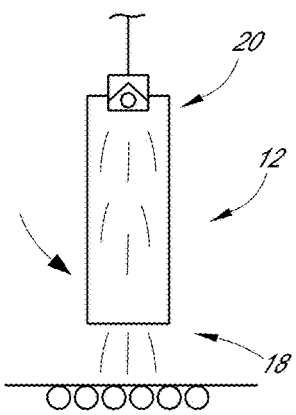

In certain embodiments, the system 10 is configured to wash the dispensing unit 12. For example, as shown in FIG. 2E, the dispensing unit 12 can be rotated to an approximately inverted position. In some embodiments, the control valve 28 is toggled to allow cleansing fluid to pass into the dispensing unit 12, for example to allow potable water to flow through the tubing 16 and check valve 24 and into the dispensing unit 12. As shown, in some embodiments, the cleansing fluid enters the second end 20 of the dispensing unit 12, which is the top end of the dispensing unit 12 when in the inverted position. The cleansing fluid can pass down the interior walls of the dispensing unit 12. In some embodiments, the cleansing fluid can be discharged out of the first end 18 of the dispensing unit 12 and into the drain or catch basin.

Certain implementations are configured to spray, or otherwise distribute, the cleansing fluid around the entire, or at least substantially the entire, internal circumference of the shell of the dispensing unit 12. This can increase the likelihood that cleansing fluid will reach substantially the entire internal surface area of the dispensing unit 12. Some embodiments include a diffuser configured to direct the cleansing fluid around substantially the entire internal circumference of the dispensing unit 12. In certain implementations, the cleansing fluid is sprayed against the internal surface of the dispensing unit 12 at a substantially perpendicular angle and/or at or near the second end 20 of the dispensing unit 12. Some embodiments are configured to spray the cleansing fluid in a downward direction.

In some variants, the system 10 includes jets and/or nozzles adapted to spray cleansing fluid into the dispensing unit 12. For example, the jets and/or nozzles can spray cleansing fluid generally upwardly into the first end 18 of the dispensing unit 12. The cleansing fluid can fall downward via force of gravity into the drain or catch basin. Some embodiments do not include jets or nozzles configured to spray cleansing fluid upwardly into the dispensing unit 12.

Some implementations include drying functionality. For example, some embodiments include an active drying feature, such as a blower. The blower can be configured to direct a flow of air around and/or into the dispensing unit 12 (e.g., through the first end 18) to facilitate drying of the dispensing unit 12. Some implementations include a passive drying feature, such as a rest period. For example, movement and/or use of the dispensing unit 12 can be stopped for a period to facilitate drying, such as for at least about: 5 seconds, 10 seconds, or otherwise. In some embodiments, the rest period occurs when the dispensing unit 12 is in the inverted position.

Figure 2F:
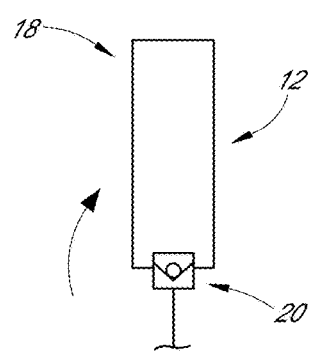

As shown in FIG. 2F, the dispensing unit 12 can be rotated (e.g., in a second direction opposite the first direction), such as to about the upright position shown in FIG. 1. This can put the dispensing unit 12 in a position to be ready to receive another amount of beverage from the beverage preparation machine 14, and to progress again through some or all of the above-described operational states.

Figure 3:
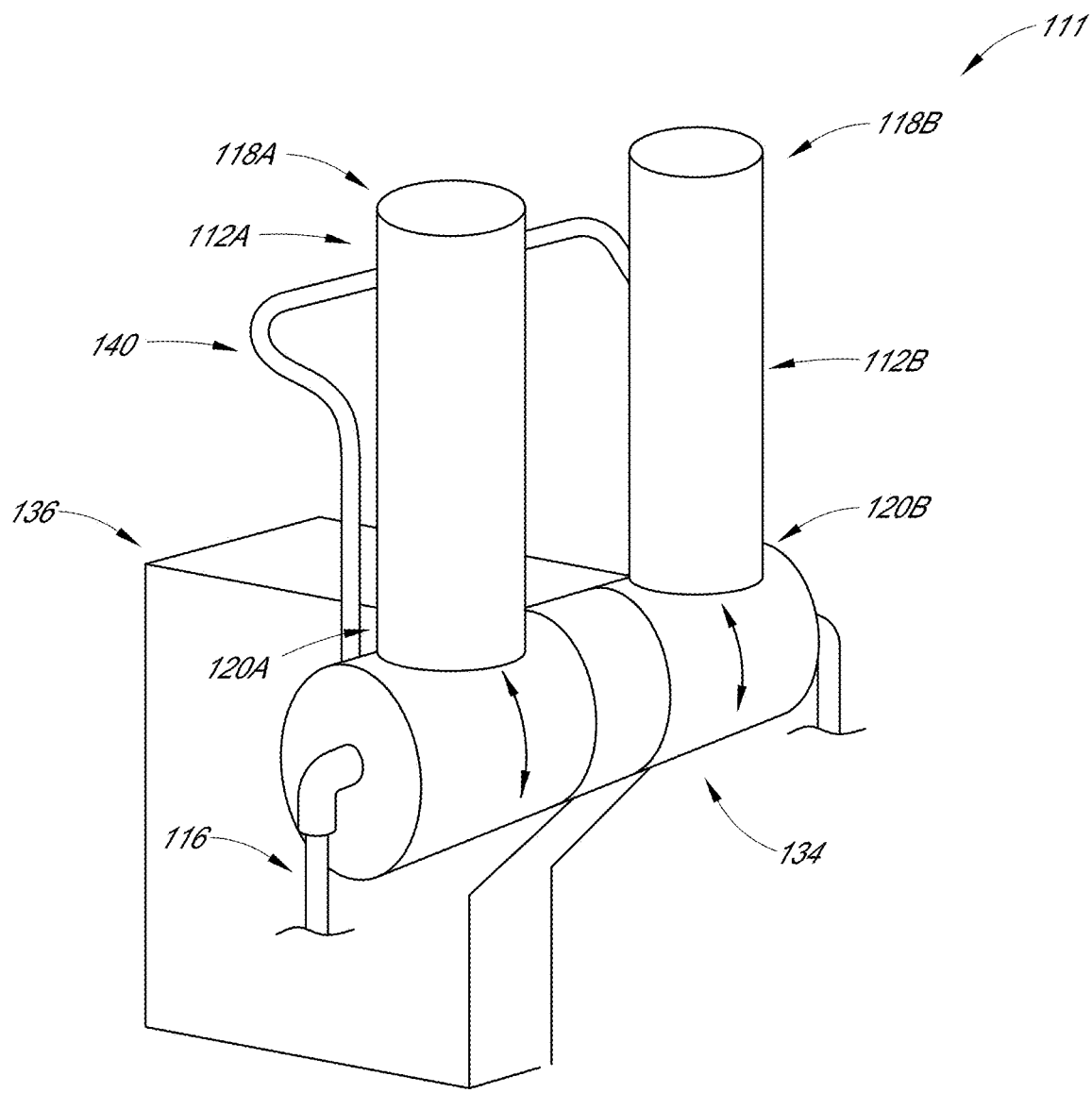
FIG. 3 illustrates an embodiment of a double-shot beverage dispensing assembly.
Figure 4:
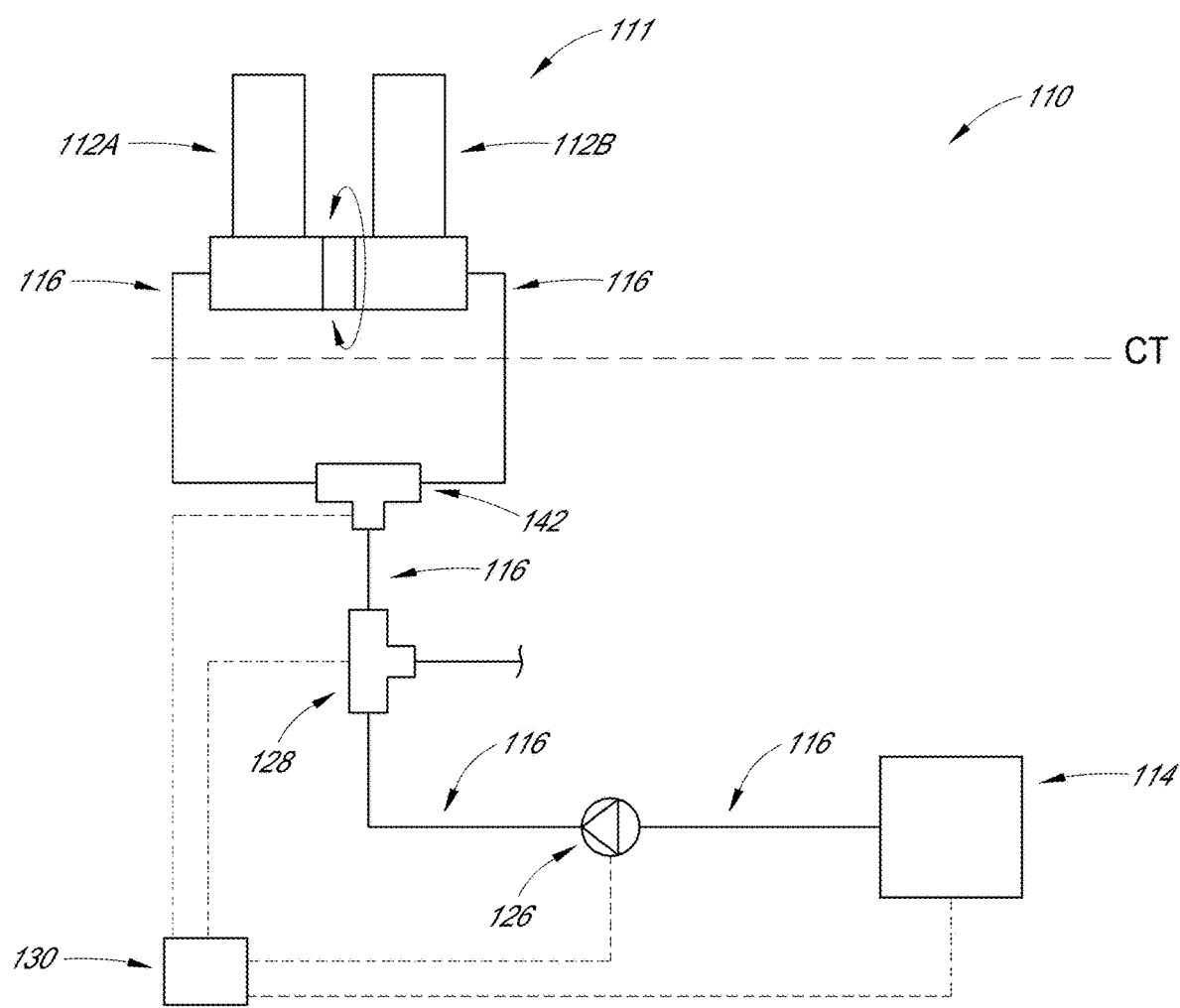
FIG. 4 schematically illustrates another embodiment of a beverage dispensing system, such as a system that includes the assembly of FIG. 3.

Multi-Shot Dispensing Assembly (FIGS. 3 and 4)

Certain beverage preparation machines are adapted to produce multiple servings of a beverage at a time, such as two shots of espresso. Thus, it can be advantageous for a beverage preparation system to be configured to receive, hold, and/or dispense multiple servings of the beverage, such as being configured to receive, hold, and dispense two shots of espresso. An example of a double-shot beverage dispensing assembly 111 is illustrated in FIG. 3 and an example of a system 110 including the assembly 111 is illustrated in FIG. 4. As shown, the assembly 111 can include a first dispensing unit 112A and a second dispensing unit 112B.

Many of the features of the system 110 are the same as, or similar to, the features described above in connection with the system 10. To illustrate such correspondence, many of the numerals used to identify features of the system 110 are incremented by a factor of one hundred relative to the numerals used in connection with the system 10. The system 110 can include one, some, or all of the features of the system 10, including all combinations and sub-combinations. Moreover, any of the components of the system 110 can be similar to the corresponding components of the system 10. For example, the first dispensing unit 112A and the second dispensing unit 112B can each be similar to the dispensing unit 12 discussed above, including all combinations and sub-combinations. Any component or step disclosed in any embodiment in this specification can be used in other embodiment.

As illustrated, the first and second dispensing units 112A, 112B can each include an open first end 118A, 120A and a closed second end 118B, 120B. The second end 118B, 120B of the first and second dispensing units 112A, 112B can be connected to a rotating member 134, which in turn can be supported by a base 136. The rotating member 134 can enable the first and second dispensing units 112A, 112B to rotate relative to the base 136. In some embodiments, the rotating member 134 is coupled with tubing 116 through which beverage from the beverage preparation machine 14 can be delivered to the first and second dispensing units 112A, 112B. For example, as shown, the rotating member 134 can connect with the tubing 116 via an elbow connector. In various embodiments, the rotating member 134, as well as the dispensing units 112A, 112B, can rotate relative to the tubing 116.

As shown, the base 136 can project upwardly, which can raise the dispensing units 112A, 112B above a countertop CT on which the base 136 is positioned. This can position the dispensing units 112A, 112B at an elevation that is higher than the top of the cup or vessel in which the beverage is to be poured, thereby allowing the beverage to flow by force of gravity into the cup or other vessel when the dispensing units 112A, 112B are rotated downward. In some embodiments, raising the dispensing units 112A, 112B above the countertop provide space to allow the dispensing units 112A, 112B to rotate without contacting the countertop. For example, in certain embodiments, the dispensing units 112A, 112B can be inverted without hitting, impacting, and/or physically touching the countertop.

In some embodiments, the dispensing units 112A, 112B include a handle 140 or other type of grip. The handle 140 can enable a user to rotate the first and second dispensing units 112A, 112B manually. In certain embodiments, the first and second dispensing units 112A, 112B rotate together. In some embodiments, the first and second dispensing units 112A, 112B rotate independently, such as the first dispensing unit 112A being able to rotate relative to the second dispensing unit 112B and vice versa. In some embodiments, the first and second dispensing units 112A, 112B each have a handle 140 or grip. In certain variants, the assembly 111 includes one or more motors or actuators (e.g., springs) configured to rotate the first and second dispensing units 112A, 112B, either together or independently. For example, certain variants include one or more motors or actuators configured to return one or both of the dispensing units 112A, 112B to the upright position, such as after one or both of the dispensing units 112A, 112B have been rinsed with cleaning fluid and/or after a period has elapsed. Some implementations include a mechanism (e.g., a releasable detent) that holds one or both of the dispensing units 112A, 112B in a lower position, such as in a pouring position or the inverted position.

FIG. 4 schematically illustrates an embodiment of a beverage dispensing system 110 that includes the double-shot beverage dispensing assembly 111 of FIG. 3. As shown, and similar to the discussion above in connection with the system 10, the system 110 can include a controller 130 and a beverage preparation machine 14. Some embodiments include a pump 126 configured to encourage a flow of beverage from the beverage preparation machine 14 to the dispensing unit. Certain embodiments include a control valve 128 that is configured to switch between allowing the beverage to be communicated into the dispensing unit and allowing a cleansing fluid to enter the tubing 116 and be communicated into the dispensing unit. In some embodiments, the control valve 128 is a solenoid or other electronically operated valve.

In some embodiments, the system 110 includes a selector valve 142 configured to direct flow between the first and second dispensing units 112A, 112B. For example, as shown in FIG. 4, the system 110 can include a three-way valve that toggles between allowing beverage to flow to the first dispensing unit and the second dispensing unit 112A, 112B. In some embodiments, the selector valve 142 is a solenoid or other electronically operated valve. The selector valve 142 can be controlled by the controller 130 or can be manually operated. In some implementations, the system 110 automatically alternates the flow of beverage between the dispensing units 112A, 112B, such as directing a first serving of beverage to the first dispensing unit, a second serving of beverage to the second dispensing unit, a third serving of beverage to the first dispensing unit, etc.

In various embodiments, the dispensing unit is readily visible. For example, in a retail environment, such as a coffee shop, the dispensing unit can be readily visible to a customer. In this regard, as mentioned above, in some embodiments, the dispensing unit is positioned on a countertop. In certain variants, the dispensing unit is visible from a first side of the countertop (e.g., a user side) and from an opposite second side of the countertop (e.g., a customer side). In some implementations, some or all other components of the system 110 are positioned below the countertop and/or otherwise out of sight from at least the second side of the countertop. For example, the beverage preparation machine 14, controller 130, control and/or selector valve 142, and pump 126 can be located below the countertop, inside of a cabinet, and/or otherwise out of view from at least the second side of the countertop. In some embodiments, during an operation of the filling of the dispensing units 112A, 112B, the beverage can appear to a customer to materialize in the dispensing units 112A, 112B, as if from nowhere. The customer can view the beverage welling-up from the bottom of the upright dispensing unit and/or progressively collecting inside the dispensing unit. In some implementations, the customer can view the dispensing unit being rotated and the beverage being poured into a cup or other vessel. In some embodiments, the customer can view the dispensing unit being inverted and/or the washed, such as from the top down.

Figure 5:
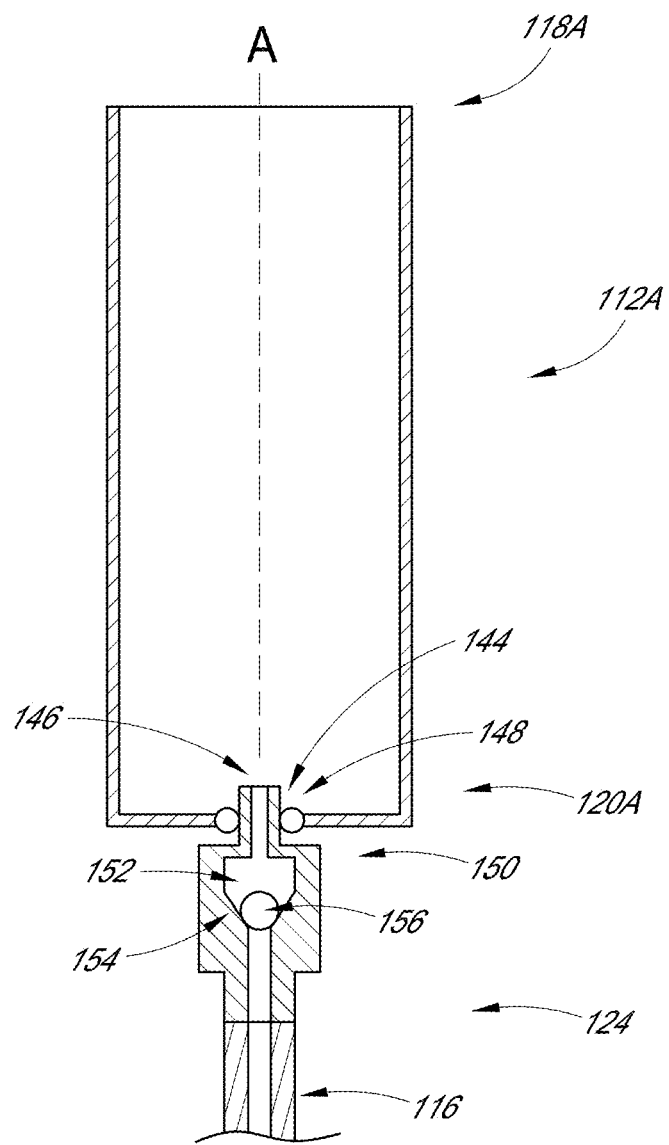
FIG. 5 illustrates a cross-sectional view of an example of the double-shot beverage dispensing assembly of FIG. 3.

Removable Dispensing Unit (FIG. 5)

FIG. 5 illustrates a cross-sectional view of the first dispensing unit 112A and an associated mounting assembly 124. Similar or identical components can be used in the system 10. In various embodiments, the dispensing unit 112A is separable from other components of the system 110. For example, the dispensing unit 112A can be configured to be removed from the mounting assembly 124. This can facilitate cleaning or replacement of the dispensing unit 112A and/or the mounting assembly 124. The mounting assembly 124 can comprise a check valve.

As shown, the dispensing unit 112A can include a generally elongate hollow body with an open first end 118A and a generally closed second end 120A. The second end 120A can include an aperture 144, such as a hole in about the center of the second end 120A. As illustrated, the aperture 144 can be adapted to receive a projection 146 of the mounting assembly 124. The mounting assembly 124 or the dispensing unit 112A can include a sealing member 148 (e.g., an O-ring, gasket, or other type of seal) configured to provide a generally liquid-tight seal between the dispensing unit 112A and the mounting assembly 124. For example, the aperture 144 can include a rubber or plastic O-ring that seals against an outer wall of the projection 146 of the check valve 124 when the projection 146 of the mounting assembly 124 is received in the aperture 144 of the dispensing unit 112A.

As mentioned above, the dispensing unit 112A can be configured to be removed from the mounting assembly 124. For example, in some embodiments, the dispensing unit 112A can be separated from the mounting assembly 124 by applying a pulling force generally along the longitudinal axis A of the dispensing unit 112A, thereby slidably disconnecting the dispensing unit 112A and the mounting assembly 124. In some embodiments, the dispensing unit 112A is configured to be disconnected by translating (e.g., sliding) the dispensing unit 112A generally parallel with the longitudinal axis A. In some embodiments, the dispensing unit 112A is configured to be disconnected by rotating the dispensing unit 112A around the longitudinal axis A. For example, in some embodiments, the dispensing unit 112A is threadably connected with the mounting assembly 124 and/or the rotating member 134, and is configured to be disconnected by rotating the dispensing unit 112A around the longitudinal axis A. Certain implementations are configured to connect and/or disconnect the dispensing unit 112A and the mounting assembly 124 without relative rotation of the dispensing unit 112A and the mounting assembly 124. In some embodiments, the dispensing unit 112A is configured to contain fluid after being disconnected from the mounting assembly 124. For example, the dispensing unit 112A can include a closure mechanism (e.g., a flapper valve, umbrella valve, duckbill valve, etc.) configured to close the aperture 144, thereby inhibiting liquid in the dispensing unit 112A from being discharged through the aperture 144. In some embodiments, the dispensing unit 112A comprises a check valve that inhibits leakage from the aperture 144 after the dispensing unit 112A has been disconnected from the mounting assembly 124. In certain implementations, the dispensing unit 112A can be disconnected from the mounting assembly 124 and contents of the dispensing unit 112A can be poured by hand into a cup or other vessel. In some embodiments, extent of travel of the dispensing unit 112A is limited. For example, the dispensing unit 112A can be tethered to the base 136 or other component of the system 110, such as with a cord, chain, cable, or otherwise.

As illustrated, in some embodiments, the mounting assembly 124 includes a housing 150 with an inner chamber 152 that includes a tapered wall 154. The chamber 152 can include a sealing member, such as a ball 156, which can seat against the tapered wall. In some embodiments, the ball 156 is glass, plastic, or metal. As shown, in the upright orientation of the dispensing unit 112A, the ball 156 can seal against the tapered wall 154, such as by the force of gravity. When fluid is encouraged through the tubing 116, fluid can displace the ball 156, thereby opening the mounting assembly 124 and allowing the fluid to flow into the dispensing unit 112A. When the flow of fluid decreases or ends, the ball 156 can again seat against the tapered wall 154, thereby inhibiting or preventing fluid from flowing in the opposite direction.

In certain embodiments, as the dispensing unit 112A is pivoted, gravity displaces the ball 156 from being seated against the tapered wall 154, thereby opening the mounting assembly 124. In certain embodiments, such opening of the mounting assembly 124 does not occur until a certain amount of rotation of the dispensing unit 112A has occurred, such as at least about: about: 30°, 60°, 70°, 80°, 85°, 90°, 95°, values between the aforementioned values, or otherwise. In some variants, such opening of the mounting assembly 124 does not occur until a majority, or at least some, of the beverage in the dispensing unit 112A has been poured out of the first end 118A of the dispensing unit 112A.

In various embodiments, opening of the mounting assembly 124 can result in and/or facilitate automatically clearing a portion of the tubing 116. For example, opening of the mounting assembly 124 can permit ambient air to enter the tubing 116. This can aid in equalizing the pressure between the inside of the tubing 116 and ambient and/or can reduce or eliminate a pressure differential (e.g., vacuum) in the tubing 116. In some embodiments, permitting air to enter the tubing 116 can allow at least a portion of the beverage in the tubing 116 to flow back into the beverage preparation machine 14, into a container, and/or into the drain or catch basin. In various embodiments, rotating the dispensing unit 112A to pour the beverage into the cup or other vessel automatically results in opening of the mounting assembly 124, such as without requiring additional steps or actions by a user.

In some embodiments, when the dispensing unit 112A is at or near the inverted position (see FIG. 2E), the mounting assembly 124 is open. For example, when the dispensing unit 112A is in the inverted position, the ball 156 can be spaced apart from the tapered wall 154 of the inner chamber 152 and fluid can be allowed to pass through the mounting assembly 124. This can allow cleansing fluid to flow through the mounting assembly 124 and into the inverted dispensing unit 112A, as discussed above.

Figure 6:
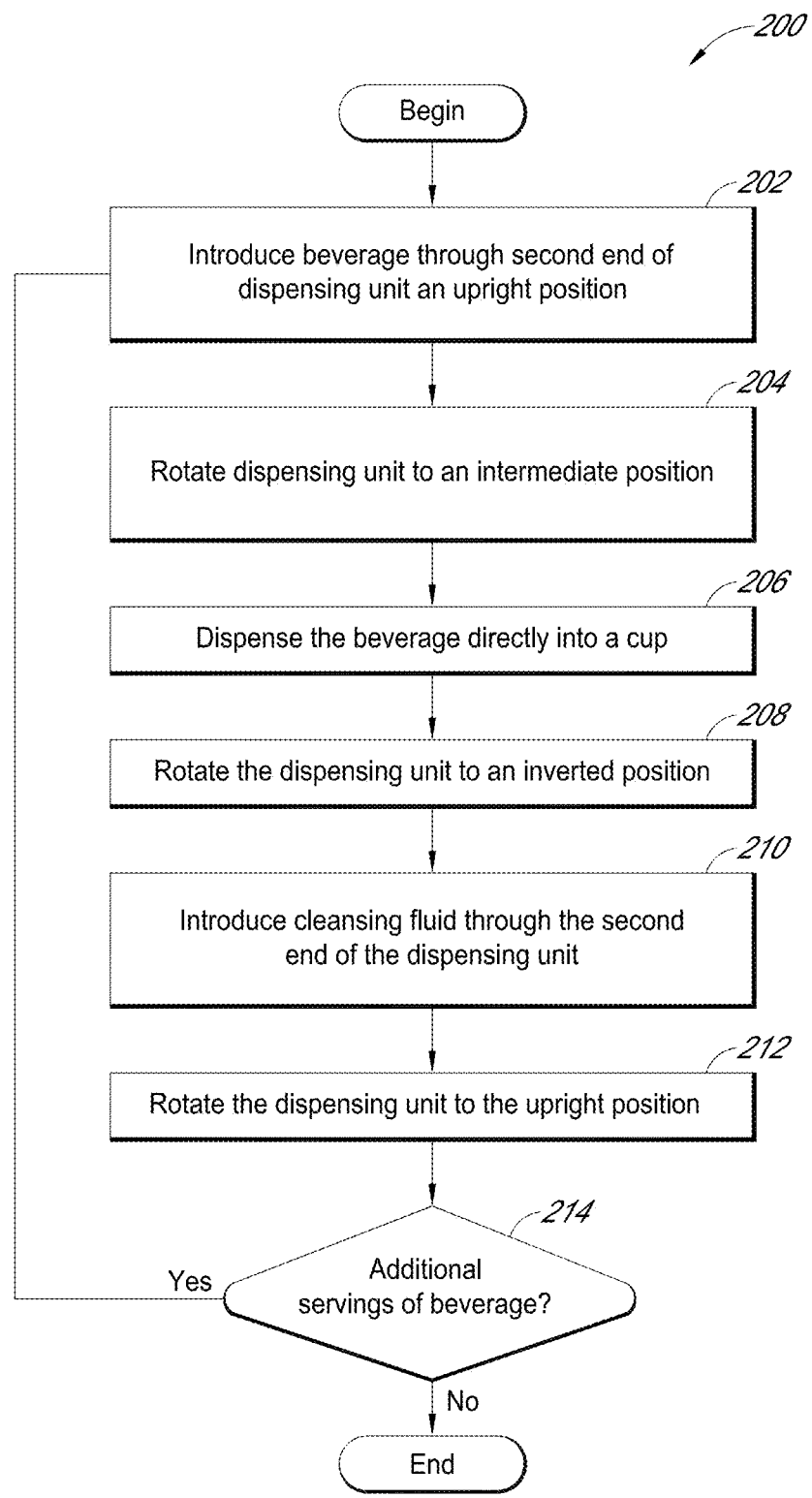
FIG. 6 schematically illustrates an embodiment of a method related to certain of the beverage dispensing systems.

Certain Methods Related to Beverage Dispensing Systems (FIG. 6)

FIG. 6 illustrates an example method 200 related to various beverage dispensing systems. As shown, in some embodiments, the method 200 includes introducing a beverage through a second end of the dispensing unit 202. This can be performed when the dispensing unit is in the upright position, such that the second end is at the bottom of the dispensing unit and/or is below the first end. In certain implementations, the beverage is introduced generally upwardly into the dispensing unit (e.g., upward and generally parallel with a vertical axis). Some embodiments include receiving, in the dispensing unit, at least about 1 shot of beverage and/or at least about 25 ml of beverage. Certain variants include filling a substantial volume of the dispensing unit with the beverage, such as at least about: 75%, 80%, 85%, 90%, 95%, percentages between the aforementioned percentages, or other percentages. Before block 202, some embodiments include preparing the beverage and/or transporting the beverage to the dispensing unit.

The method 200 can include rotating the dispensing unit to an intermediate position 204. For example, the dispensing unit can be rotated at least about: 60°, 75°, 90°, 105°, 120°, values between the aforementioned values, or otherwise. Some embodiments of the method 200 include dispensing the beverage from the dispensing unit 206, such as by pouring the beverage directly into a cup or other vessel. In some embodiments, all or substantially all of the beverage is dispensed from the dispensing unit 206. For example, of the pre-dispensed volume of beverage contained in the dispensing unit, certain implementations include dispensing at least about: 90%, 95%, 99%, percentages between the aforementioned percentages, or other percentages.

In some embodiments, the method 200 includes rotating the dispensing unit to a cleansing position, such as an approximately inverted position 208. In some embodiments, the dispensing unit is not perfectly inverted. For example, the dispensing unit can be offset from perfectly inverted by at least about: 1°, 3°, 5°, 10°, values between the aforementioned values, or otherwise. In some embodiments, between block 202 and 208, the method 200 includes rotating the dispensing unit at least about: 120°, 140°, 160°, 180°, 200°, values between the aforementioned values, or otherwise.

Certain embodiments include introducing the cleansing fluid through a second end of the dispensing unit 210. This can be performed when the dispensing unit is in the inverted position, such that the second end is at the top of the dispensing unit and/or is above the first end. Some embodiments include positioning a control valve to allow cleansing fluid, such as water, to pass through the valve and into the dispensing unit. Certain implementations include flowing the cleansing fluid downward along some or all of the length of the dispensing unit. Some embodiments include carrying-away, with the cleansing fluid, residue from the internal surface of the dispensing unit. Certain implementations include discharging the cleansing fluid from the first end of the dispensing unit, such as into a drain or catch basin.

In some embodiments, the method 200 includes rotating the dispensing unit 212, such as to the upright position. For example, the dispensing unit can be rotated approximately 180°. In some embodiments, the dispensing unit is rotated in opposite rotational directions when rotating from the upright position to the inverted position, and from the inverted position to the upright position. In some variants, the dispensing unit is rotated in the same rotational direction when rotating from the upright position to the inverted position, and from the inverted position to the upright position. Certain embodiments include positioning a control valve to allow beverage to pass through the control valve and into the dispensing unit. In some embodiments, such as embodiments with more than one dispensing unit, the method can including positioning a selector valve to change which dispensing unit is configured to receive the next flow of beverage.

As illustrated, the method 200 can include a decision block 214, which can ask whether there are additional beverage servings to be prepared and/or dispensed. If the answer is yes, then the method 200 can return to block 202 to introduce additional beverage into the dispensing unit and the method 200 can continue. In some embodiments, if the answer to the decision block 214 is no, then the method 200 ends.

Figure 7:
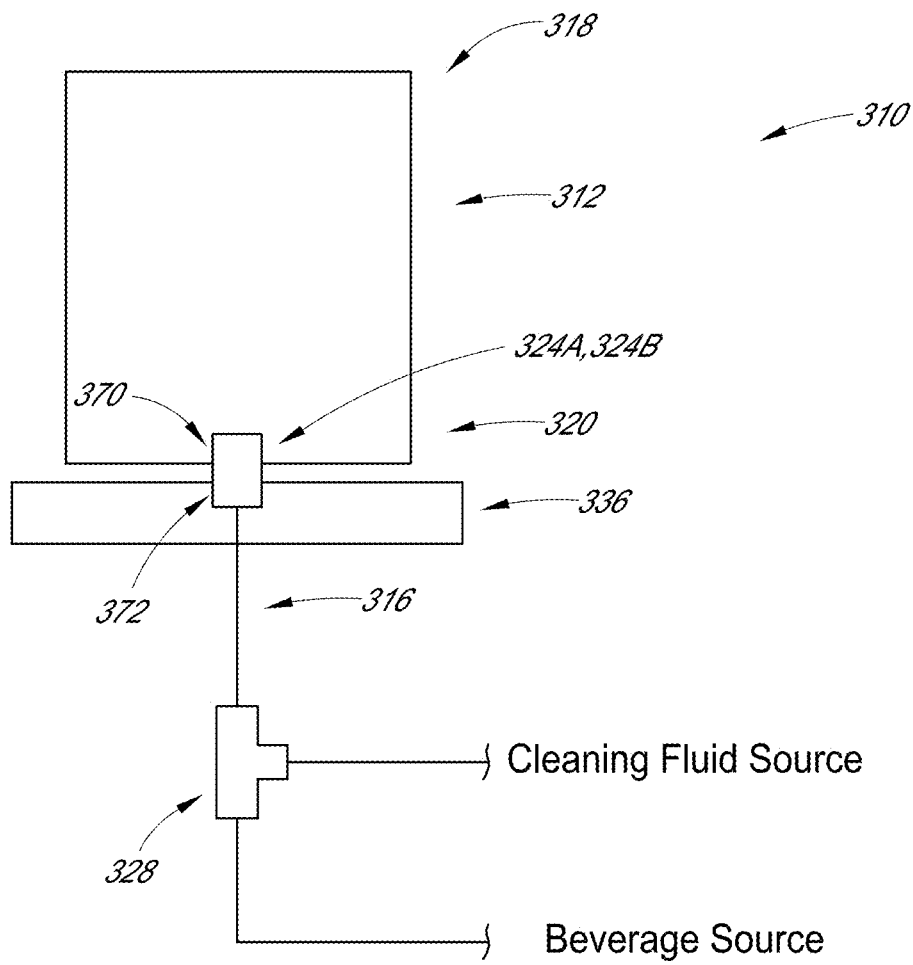
FIG. 7 schematically illustrates another embodiment of a beverage dispensing system, such as a system comprising a base that is configured to engage with, and introduce fluid through, a bottom of a container.
Figure 8:
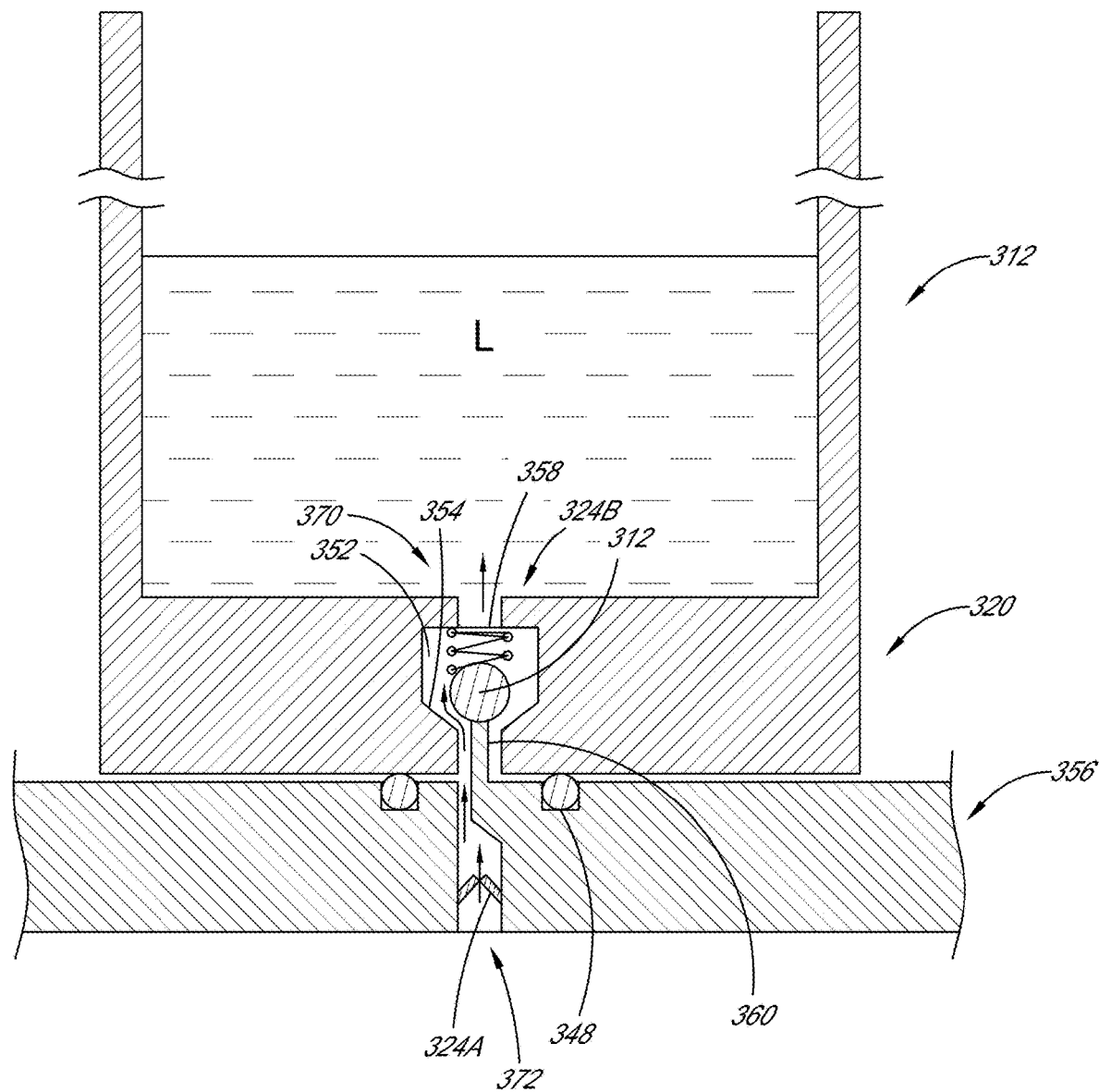
FIG. 8 illustrates a cross-sectional view of an example of the base of the system of FIG. 7 engaged with the container.
Figure 9:
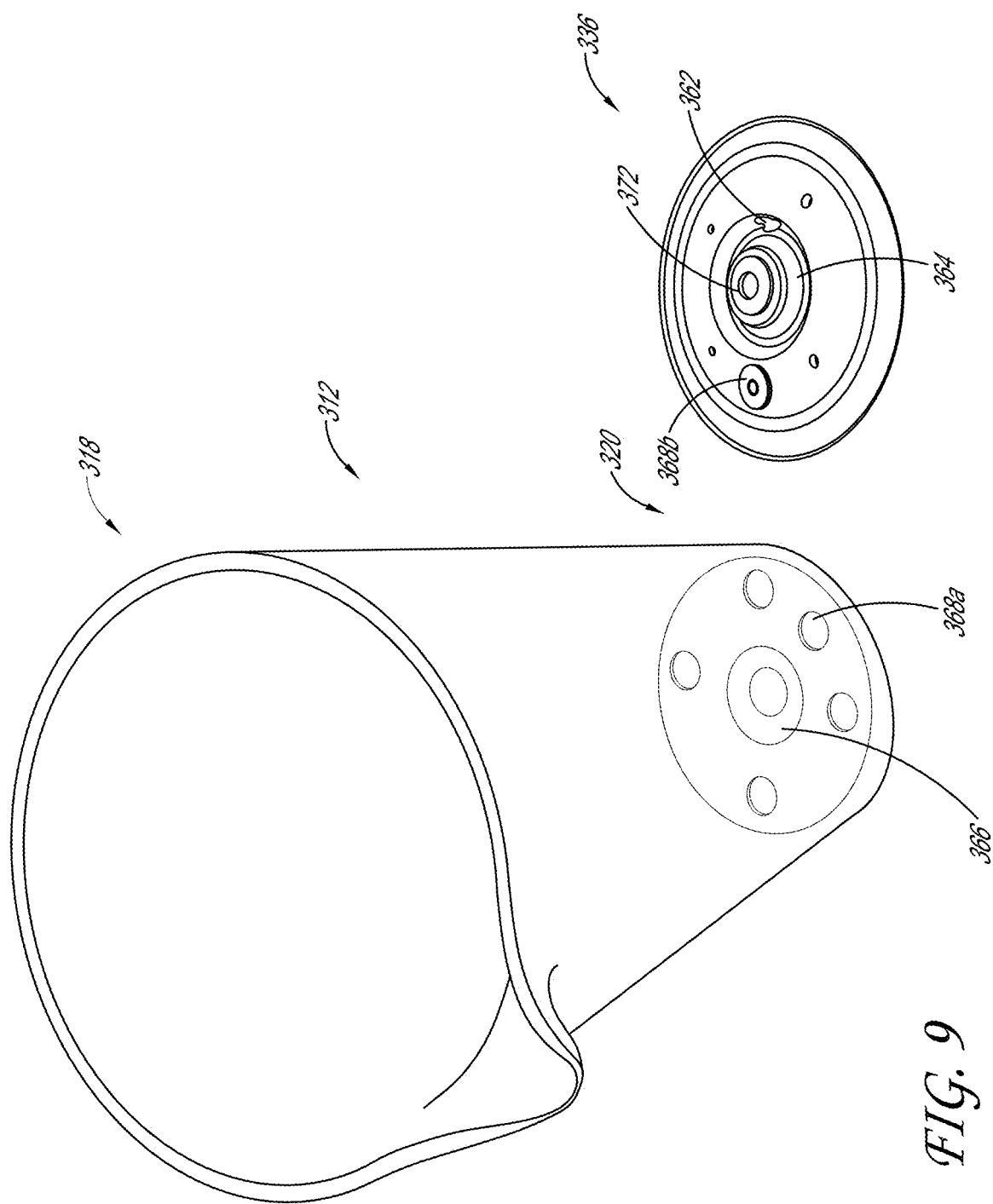
FIG. 9 depicts further examples of a base and container that can be used with the system of FIG. 7, with the container in an upright position.
Figure 10:
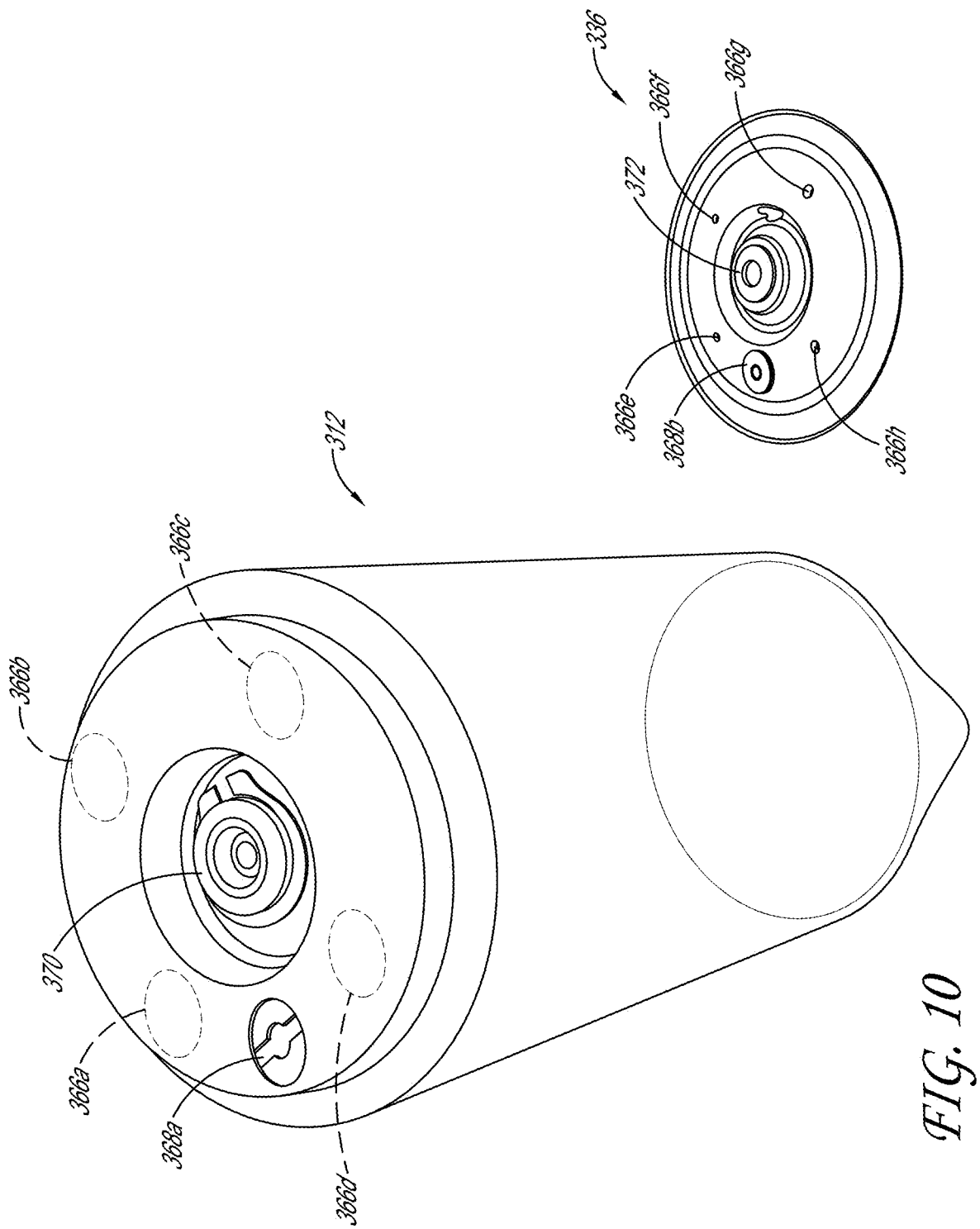
FIG. 10 depicts the base and container of FIG. 9, with the container in an inverted position.
Figure 11:
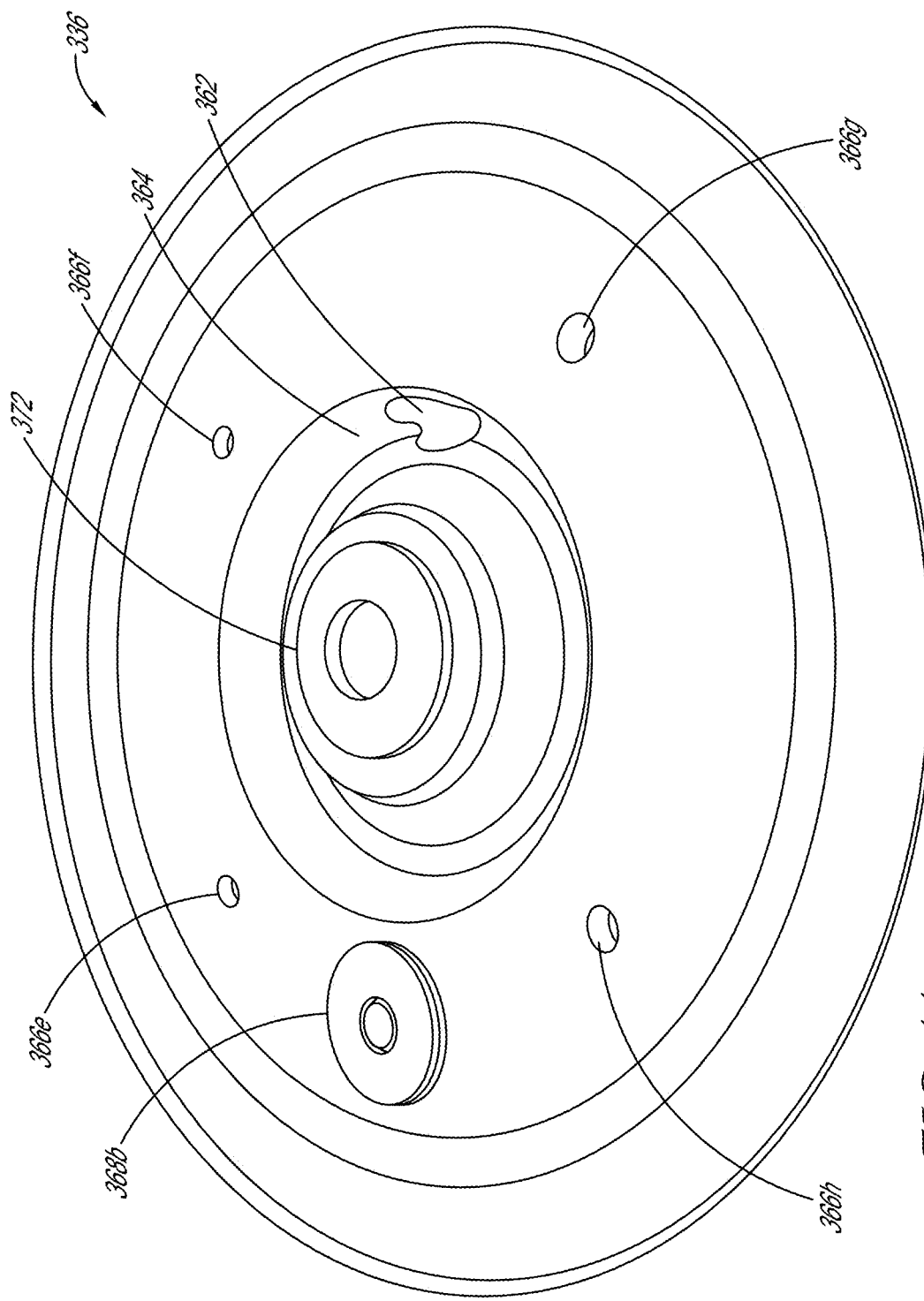
FIG. 11 depicts a close-up view of the base of FIG. 10.
Figure 12:
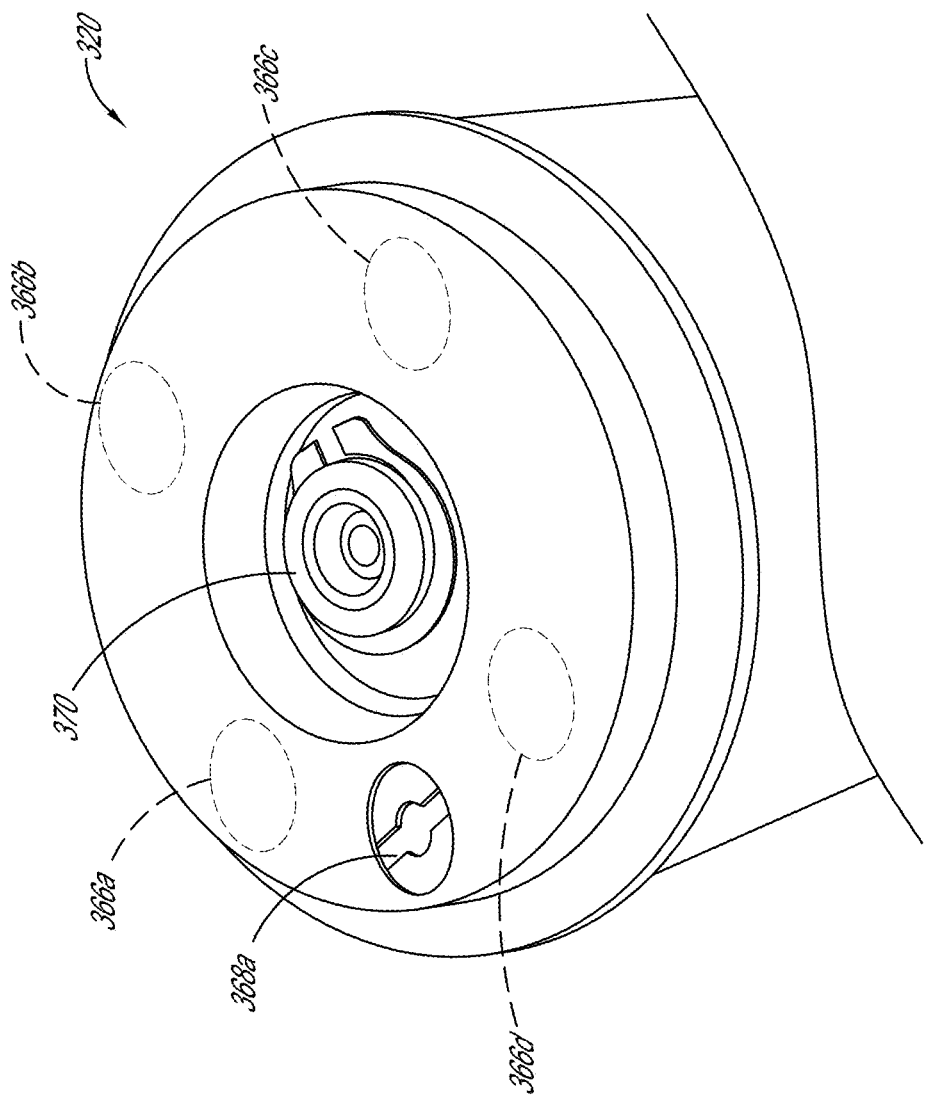
FIG. 12 depicts a close-up view of a bottom of the container of FIG. 10.

Certain Beverage Dispensing Systems with Removable Containers (FIGS. 7 and 8)

FIG. 7 illustrates an example of a beverage dispensing system 310. Many of the features of the system 310 are the same as, or similar to, the features described above in connection with the systems 10, 110. To illustrate such correspondence, many of the numerals used to identify features of the system 310 are incremented by a factor of one hundred relative to the numerals used in connection with the systems 10, 110. The system 310 can include one, some, or all of the features of the system 10 and/or the system 110, including all combinations and sub-combinations. Moreover, any of the components of the system 310 can be similar to the corresponding components of the systems 10, 110.

The system 310 can include, and/or engage with, a removable container 312, such as a pitcher, jug, cup, or other vessel. The container 312 can be configured to hold and/or dispense a beverage, such as a coffee drink, dairy drink (e.g., milk, cream, half-and-half, or otherwise), juice, or another beverage. In some embodiments, the container 312 is configured to hold multiple servings of the beverage, such as two, three, four, five, six, or more servings. As illustrated, the container 312 can include an upper end 318 and a lower end 320, which can include the bottom of the container 312. An interior of the container 312 can be in communication with a liquid source through the tubing 316, such as a source of a liquid component of the beverage. For example, a flow of milk from a milk dispenser can pass through the tubing 316 and into the container 312. The interior of the container 312 can hold a volume of liquid L, such as at least about: 250 ml, 500 ml, 750 ml, 1 liter, volumes between the aforementioned volumes, or other volumes. In some embodiments, the system 310 is configured to introduce steam into the container 312 and/or the tubing 316, as is described in more detail below.

As shown, the lower end 320 of the container 312 can engage with a base 336 of the system 310. Such engagement can open a fluid passage (also called a port) into an interior of the container. For example, a container port 310 in the container 312 and a base port 372 in the base 336 can be opened, thereby forming the fluid passage therethrough. In some implementations, the fluid passage extends through the base 336 and through the lower end 320 (e.g., the bottom) of the container 312. In some embodiments, the engagement of the container 312 and the base 336, and/or a flow of fluid, opens one or more flow-control valves, such as a check valve 324A in the base port 372 and/or a check valve 324B in the container port 370.

Figure 7A:
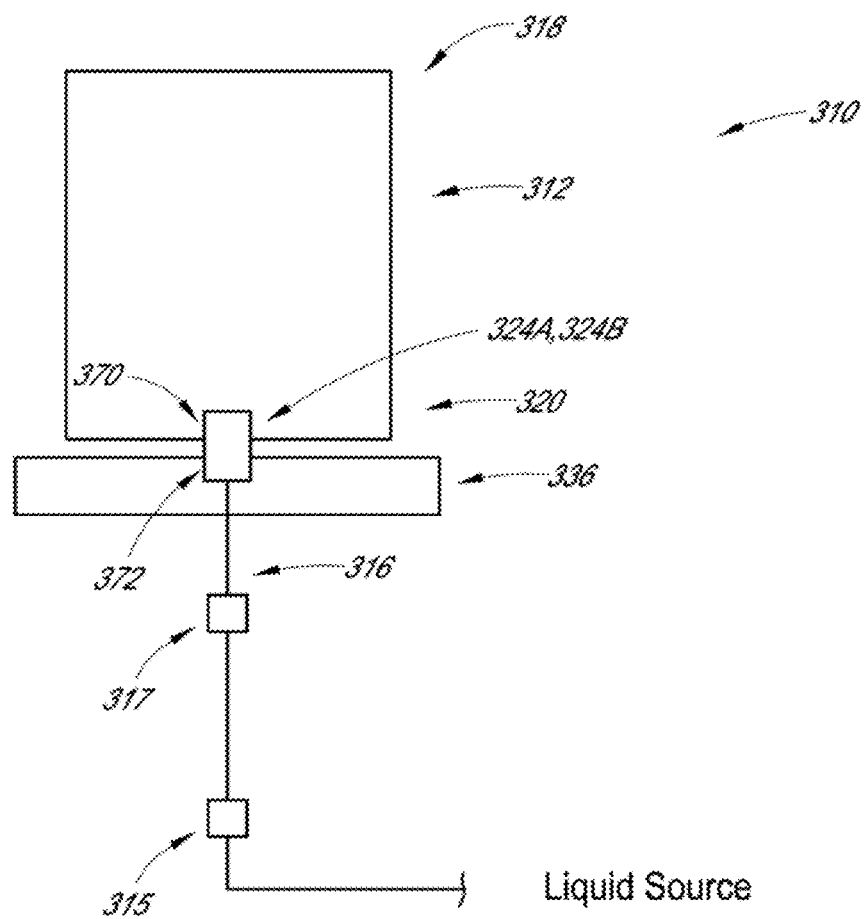
FIG. 7A illustrates an embodiment of a beverage dispensing system with a heating unit and an aerating unit.

As mentioned above, the system 310 can be configured to place an interior of the container 312 in communication with a liquid source, such as a source of milk. In some embodiments, the system 310 is configured to heat the liquid (e.g., milk) before the liquid has been introduced into the container 312. For example, as shown in FIG. 7A, certain embodiments include a heater 315 (also called a heating unit) that is configured to heat the liquid passing through the tubing 316. The heater can comprise an in-line heater, heat exchanger, or otherwise. The heated liquid can be introduced into the container 312, such as through the port in the container 312.

In some embodiments, the system 310 is configured to aerate the liquid, such as after the liquid has been heated. For example, after the heated liquid has been introduced into the container 312, a steam wand can be inserted through an open upper mouth of the container 312 and into the heated liquid. Air and/or steam can be passed though the wand and into the heated liquid. In some embodiments, air is added to the steam to facilitate the aerating operation, such as through an air inlet port in fluid communication with a stream of steam from a steam source. In some variants, as shown in FIG. 7A, air is added to the liquid (e.g., milk) in an aeration unit 317, such as through the steam wand before introducing the steam through the wand and/or through an air inlet port in the tubing 316. In certain implementations, air is added to the liquid to aerate the liquid before heating occurs.

In some embodiments, the system 310 is configured to heat and/or aerate the liquid after the liquid has been introduced into the container 312. For example, the system 310 can be configured to introduce unheated liquid (e.g., milk at a temperature of less than or equal to about 45° F.) into the container 312, and then to heat the liquid (e.g., by introducing steam into the liquid in the container 312). The steam can transfer heat to the liquid and/or can incorporate air or other gases into the liquid. In certain implementations, the introduction of steam can induce movement of the liquid within the container 312, which can facilitate mixing. In some embodiments, heating, aeration, and/or mixing of the liquid occurs substantially concurrently and within the container 312. In certain implementations, the liquid is introduced substantially completely before the steam is introduced. For example, the introduction of the liquid can finish before the introduction of steam begins. In some variants, the introduction of steam begins before the introduction of the liquid finishes.

In some embodiments, the liquid and steam are introduced through the same port, such as the container port 370. In some embodiments, the liquid and steam are introduced through different ports, such as a dedicated liquid port and a dedicated steam port in the container 312 and/or the base 336. As shown in FIG. 7, in certain implementations, one or both of the ports can be substantially radially centered in relation to the dispensing unit 312 and/or the base 336. In certain variants, one or both of the ports are not radially centered in relation to the dispensing unit 312 and/or the base 336. For example, the steam inlet port may be offset from the center. This can aid in achieving the proper turbulent flow to entrap air and/or froth the liquid (e.g., milk) in the dispensing unit 312. As schematically illustrated, the port or ports can be positioned in the bottom of the container 312. This can allow the liquid to appear to rise and/or emanate from the bottom of the container 312 and/or for the steam to pass through some or all of the depth of the liquid. In some embodiments, the port or ports are configured to provide a minimum flow rate of the liquid and/or a minimum flow velocity of the steam. The minimum flow rate can be a rate that provides at least a certain amount of volume within a period, such as at least about 450 ml of liquid in about 6 seconds. The minimum flow velocity can be a high enough velocity to create sufficient agitation and/or mixing of liquid, and a lower enough velocity to cause substantially no splashing out of the container 312. For example, the flow velocity can be between about 1.0 m/s and 1.5 m/s, such as about 1.2 m/s. In some implementations, the liquid port has a diameter of about 9 mm and/or the steam port has a diameter of about 4 mm. In certain embodiments, the steam port comprises a restricting orifice, such as an orifice with a diameter between about 1 mm and 2 mm. In some embodiments, the orifice can aid in producing satisfactory quality and/or quantity of foam in the liquid, and/or can aid in controlling the amount of air entering the stream of steam.

As further shown in FIG. 7, some variants of the system 310 include a control valve 328, such as a three-way valve. The control valve 328 can be configured to permit a flow of cleansing fluid (e.g., potable water) to enter the tubing 316. In some implementations, the flow of cleansing fluid flushes or otherwise cleanses some or all of the tubing 316, control valve 328, container 312, and/or other components of the system 310. Certain implementations of the system 310 have additional valves or other components, such as a pump and/or controller. In some embodiments, the system 310 is configured to automatically provide a predetermined amount of liquid to the container 312, such as at least about: 50 ml, 100 ml, 200 ml, 400 ml, 600 ml, 800 ml, 1 liter, volumes between the aforementioned volumes, or other volumes.

Certain implementations include a steam valve, which can be the control valve 328 or another valve, that controls the flow of steam. In some embodiments, when the steam valve is open, steam can flow from a steam source and into the tubing 316. The steam can flow through the tubing 316, through the port, and into the container 312. In some variants, the steam valve is part of a manifold. Some embodiments include one or more check valves to inhibit or prevent backflow. For example, the system 310 can be configured to inhibit or prevent the liquid, the steam, and/or condensation from flowing upstream toward the milk source and/or the steam source.

In some embodiments, the steam valve is controlled by a controller. The controller can operate the steam valve to provide a certain amount of steam, such as in terms of volume, elapsed time, desired amount of heating of the liquid (e.g., temperature setpoint), or otherwise. In some variants, the controller operates the steam valve to provide a certain amount of time, or a certain amount of flow, that steam is allowed to flow into the container 312, such as at least about: 2 seconds, 4 seconds, 6 seconds, 8 seconds, 10 seconds, values between the aforementioned values, or other values. In certain implementations, the steam valve is a two-position valve, such as an electronic solenoid valve. In some embodiments, the steam valve is a variable valve, such as a ball or butterfly valve. This can enable adjustment of the volume and/or velocity of steam delivered from the valve. For example, some embodiments are configured to vary (e.g., increase or decrease) the volume and/or velocity of the steam near the beginning and/or the end of the steam introduction process, such as during or near the first and/or last 5 seconds of the process.

In some implementations, the controller is in communication with a user input device, such as a touch pad, dial, button, lever, or otherwise. In some implementations, after introducing milk into the container 312, the system 310 waits for a user to signal, via the user input device, that the steam introduction process should begin. In certain variants, after introducing milk into the container 312, the system 310 automatically begins introducing steam into the container 312. The automatic introduction can occur substantially immediately after the introduction of milk finishes, or after a delay has elapsed after the introduction of milk has finished. For example, the delay can be at least about: 1 second, 2 seconds, 3 seconds, or otherwise.

FIG. 8 illustrates a partial cross-sectional view of an example of the base 336 engaged (e.g., mated) with an example of the container 312. As shown, the base 336 can include a platform configured to receive the container 312, such as a generally planar and horizontal tray that stably supports the container 312. Some embodiments include a sealing member 348, such as an O-ring. The sealing member 348 can provide a generally liquid tight seal between the container 312 and the base 336. As shown, the sealing member 348 can be positioned in a groove in an upper face of the base 336. In certain variants, the sealing member 348 is positioned in a groove in the bottom of the container 312.

The base 336 can include the check valve 324A, such as a duckbill valve, diaphragm valve, umbrella valve, ball check valve, or other type of flow control valve. In various embodiments, the check valve 324A is configured to open in response to fluid flowing in a direction toward the container 312 and to close in response to fluid flow in the opposite direction and/or in response to substantially no fluid flow. Thus, the check valve 324A can inhibit or prevent backflow of fluid.

As illustrated, the container 312 can include the check valve 324B. The check valve 324B can be configured to inhibit or prevent liquid from exiting the container 312 when the container 312 is disengaged from the base 336. In some embodiments, the check valve 324B includes an inner chamber 352 with a tapered wall 354. The chamber 352 can include a sealing member, such as a ball 356, which can seat against the tapered wall 354. The ball 356 can be engaged with (e.g., pressed against) the tapered 354 wall by a biasing member, such as a helical spring 358. This can close the check valve 324B and provide a generally liquid tight seal. Thus, the liquid L in the interior of the container 312 can be inhibited or prevented from exiting through the check valve 324B.

In some embodiments, the check valve 324B in the container 312 is automatically opened when the container 312 is engaged with the base 336. For example, as shown, a projection 360 of the base 336 can engage with the ball 356 of the check valve 324B. This can move the ball 356 against the bias of the spring 358, which can open a flow path through the check valve 324B. In certain embodiments, as shown in FIG. 8, when the container 312 is engaged with the base 336 and the flow of fluid (e.g., liquid or steam) is in a direction toward the container 312, the fluid can flow through the check valves 324A, 324B, through the port, and into an interior of the container 312. In various implementations, the system 310 is configured to introduce liquid into the container 312 through the bottom of the container 312.

In some embodiments, the check valve 324B is automatically closed when the container 312 is disengaged with the base 336. For example, when the container 312 is removed from the base 336, the projection 360 of the base 336 is disengaged from the ball 356 and the bias of the spring moves the ball back into engagement with the tapered wall 354. This can result in the check valve 324B closing and inhibiting or preventing backflow of the liquid L. Thus, the container 312 can be moved to another location without the liquid L spilling out through the bottom of the container 312.

As mentioned above, in some embodiments, the base 336 includes the projection 360. In certain embodiments, having the projection in the base 336 can allow the container 312 to have a generally planar bottom, which can allow the container 312 to be stably placed on a countertop or other location. In some variants, the container 312 includes the projection 360 and check valve 324A and the base 336 includes the check valve 324B, such as the tapered wall 354 and spring-loaded ball 356.

Various embodiments include certain other aspects, advantages, or features. For example, in some embodiments, the container 312 does not include a magnetic seal. For example, in some embodiments, the check valve 324A in the container 312 is not a magnetically operated valve. In some embodiments, the check valve 324A is not a valve comprising a diaphragm that is magnetically attracted to a bottom of the container, wherein the diaphragm is spaced apart from the bottom of the container 312 (e.g., by a pillar) when the container 312 is engaged with the base 336, and wherein the diaphragm moves (due to the magnetic attraction) into sealing engagement with the bottom of the container 312 when the container 312 is disengaged with the base 336. In some embodiments, substantially the entire, the entire, or at least the bottom of the container 312 is made of a magnetic material. In certain variants, substantially the entire, the entire, or at least the bottom of container 312 is made of glass or a metal, such as stainless steel. Various embodiments do not require the container 312 to be rotated with respect to the base 336 during engagement and/or disengagement between the container 312 and base 336. In some implementations, the surface of the base 336 that receives the container 312 is generally flat and/or does not comprise an upwardly extending pillar. In various embodiments, the container 312 is configured to be used for preparing a beverage and/or is not the vessel from which the beverage is consumed. In certain embodiments, the system 310 is configured to introduce the liquid into the container 312 in a generally vertical direction and/or not in a substantially radially outward direction in the container 312. In certain embodiments, the system 310 is configured to heat the liquid, such as with a heating element that heats (e.g., to at least about 45° C.) the liquid flowing through the tubing. In some implementations, the beverage source is not a pressurized carbonated beverage supply, such as a beer keg.

FIGS. 9-12 depict additional non-limiting examples of the base 336 and the container 312. As shown, the base 336 can be positioned in, under, and/or generally flush with a countertop or other surface. For example, as depicted, the base 336 can be positioned in an opening in the countertop such that the top of the base 336 is about flush with the top of the countertop. In various embodiments, the periphery of the base 336 is sealed or otherwise connected with the countertop to inhibit or prevent liquid from passing between the base 336 and the countertop. As shown, in some variants, the base 336 includes a drain channel 362 and a drain outlet 364, which can receive residual liquid and drain it away, such as into a tank floor drain, or otherwise. The drain channel 362 can be positioned around the base port 372 in the base 336 to enable the drain channel 362 to catch residual liquid from the port 372.

As mentioned above, the container 312 can include an upper end 318 and a lower end 320, which can include the bottom of the container 312. The interior of the container 312 can be in communication with a beverage liquid source, such as a source of milk. The lower end 320 of the container 312 can be configured to mate with the base 336. For example, the container 312 can rest on the base 336. In some embodiments, a projection (e.g., a flange) of the container 312 is received in a recess (e.g., a channel) of the base 336.

In some implementations, when the container 312 is mated with the base 336, the container port 370 is engaged with the base port 372. For example, the ports 370, 372 can be placed adjacent to and/or in fluid communication with each other. In certain implementations, the engagement of the ports 370, 372 can open a fluid passage through the base 336 and/or into the container 312, such as to permit liquid to flow through the base 336 and into the container 312.

In some embodiments, one or both of the ports 370, 372 comprises a flow controller, such as the check valves 324A, 324B. In some variants, the flow controller in the container 312 can comprises a gravity ball valve, such as is described above in connection with FIG. 8. In some implementations, the flow controller comprises an umbrella valve, duck bill valve, slot valve, spring valve, or other type of one-way valve.

In certain variants, the container 312 and base 336 are configured to facilitate mating, such as with one or more mating features in the container 312 and base 336. For example, as depicted, the container 312 can have four mating features 366a-d and the base 336 can have four corresponding mating features 366e-h. In certain variants, the container 312 and/or the base 336 have one, two, three, five, or more mating features. In some embodiments, the mating features 366 comprise magnetic elements, threads, projections (e.g., pins) that fit into recesses (e.g., slots), or otherwise. For example, in some embodiments in which the mating features 366 comprise magnetic elements, the magnetic elements of the container 312 can attract, or be attracted by, the corresponding magnetic elements of the base 336. In various implementations, the mating features 366 can facilitate holding the container 312 and the base 336 together and/or sealing a fluid connection between the container 312 and the base 336.

Some embodiments are configured to aid in positioning the container 312 relative to the base 336. For example, the container 312 and the base 336 can include ramped surfaces that engage with each other, thereby aiding in positioning (e.g., centering) the container 312 on the base 336. In some variants, a portion of the container 312 is received in the base 336, which can aid in stabilizing the container 312. For example, a lip or shoulder on the bottom of the container 312 can be received in a corresponding recess of the base 336 and/or in the countertop.

Some embodiments are configured to control, or at least encourage, the orientation container 312 relative to the base 336. This can aid in aligning features of the container 312 with corresponding features of the base 336, such as corresponding steam ports in the container 312 and base 336, corresponding liquid ports in the container 312 and base 336, and/or corresponding portions of a sensor in the container 312 and base 336. In certain embodiments, the aforementioned mating features facilitate the orientation. For example, in some variants in which the mating features comprise magnetic elements, the arrangement and polarity of the magnetic elements control the orientation of the container 312 relative to the base 336. For example, in some embodiments, the mating feature 366a has a negative polarity and the mating features 366b-d have a positive polarity, and the mating feature 366h has a positive polarity and the mating features 366e-g have a negative polarity. In certain such embodiments, when the container 312 is placed on the base 336, the only orientation of the container 312 relative to the base 336 in which each of the mating features engage with a mating feature of opposite polarity is the orientation in which the features 366a, 366h engage. Accordingly, the orientation of the container 312 relative to the base 336 can be controlled.

Certain variants use a physical interference to control, or at least encourage, the orientation of the container 312 relative to the base 336. In some embodiments, the container 312 and base 336 can be keyed to mate in only a certain relative orientation. For example, the base 336 can have a protrusion with a shape and the container 312 can have a recess with a corresponding shape, with the shape being such that the protrusion can only be received in the recess in a single certain orientation. In some embodiments, the shape is an irregular polygon. Certain implementations include a protrusion (e.g., a pin) that is offset from the center of the base 336 and a recess (e.g., a slot) that is in a corresponding location offset from the center of the container 312.

In some embodiments, the base 336 and/or container 312 comprise features configured to transmit a signal, such as a signal related to the temperature of the container 312 and/or the liquid in the container 312. For example, the container 312 can include a probe 368a and the base 336 can include a contact 368b. As depicted, the probe 368a can be positioned inside the container 312, so as to be in physical contact with the liquid in the container 312. When the container 312 and base 336 are mated, the probe 368a can engage the contact 368b to allow the signal from the probe 368a to be transmitted, via the contact 368b, to the controller or other component of the system 310. In some embodiments, the temperature of the liquid in the container 312 is sensed with a contact device, such as the probe 368a, that physically contacts (e.g., is immersed in) the liquid in the container 312. In certain variants, a non-contact device senses the temperature without physically contacting the container 312 and/or the liquid. For example, some embodiments have an infrared sensor.

In some embodiments, the system 310 is configured to aid in cleaning the container 312. For example, the system 310 can be configured to partially or completely invert the container 312 and/or to spray cleansing fluid (e.g., water) into the container 312. In some embodiments, this is accomplished by a user removing the container 312 from the base 336 and inverting the container 312 by hand, such as over a separate rinse station. In some variants, the container 312 remains engaged with the base 336 and the base 336 is configured to rotate, such as about an axis that is generally parallel to horizontal. For example, the base 336 can be rotated by a motor, which is controlled by the controller. Rotation of the base 336 can result in the container 312 on the base 336 being moved to a rotated position. In some embodiments, in moving to the rotated position, the container 312 is flipped, such as about 180° and/or inverted (e.g., upside-down). In some embodiments, from an upright position to the rotated position, the container 312 is rotated at least about: 120°, 150°, 180°, 210°, amounts between the aforementioned amounts, or other amounts. In various embodiments, the strength of the engagement between the container 312 and base 336 is sufficient to maintain the container 312 on the base 336, even in the rotated position. In the rotated position, residual liquid, froth, or other material in the container 312 can flow out of the container 312 by force of gravity. Some implementations include a container drain or catch basin under the residual liquid, froth, or other material.

Certain embodiments include a container cleaning unit, such as one or more nozzles. The nozzles can be configured to spray cleaning fluid (e.g., potable water) into the inverted container. For example, the nozzles can spray generally upwardly into the inverted container 312 to wash the inside of the container 312 and/or the container port 370. The cleaning fluid can fall into, and be received by, the container drain or catch basin. In some implementations, operation of the nozzles is governed by the controller. For example, the controller can control operation of a solenoid or other type of valve that opens to deliver the cleaning fluid to the nozzles. In some variants, the nozzles are part of the separate rinse station and/or are manually controlled.

In some embodiments, after the container 312 has been washed, the container 312 is returned to an upright orientation. In some embodiments, this is accomplished manually, such as by a user manually flipping the base 336 and/or the container 312 to the upright orientation. In certain variants, the motor flips the base 336 and/or the container 312 to the upright orientation.

Figure 13:
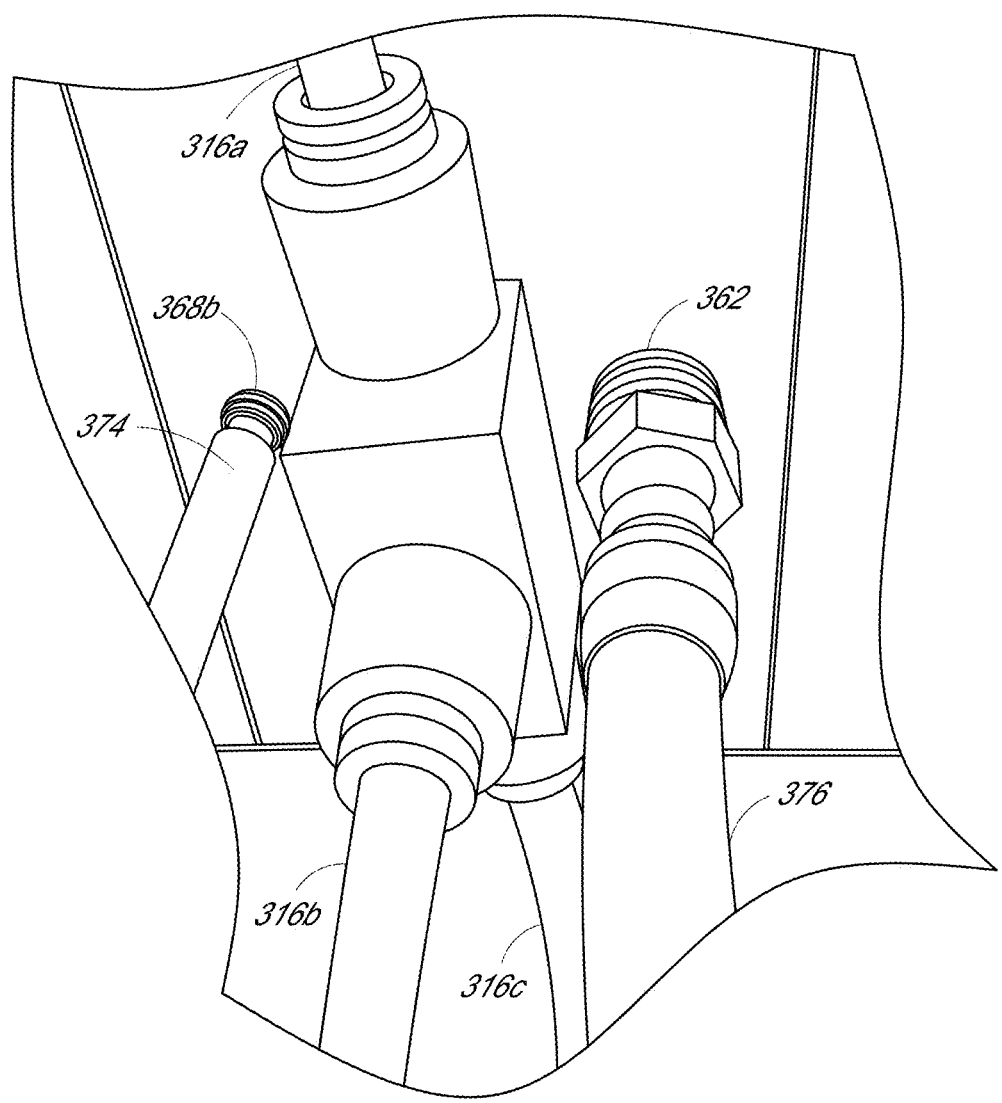
FIG. 13 depicts an example of tubing that can be used with the system of FIG. 7.

FIG. 13 depicts an example of the tubing 316 that can be used in the system 310. The depicted example is located directly beneath the base 336, though other locations are contemplated as well. As shown, the contact 368b of the base can connect with a cable 374, such as an electrical wire, and the drain 362 can connect with a drainage tube 376.

As shown, the tubing 316 can include a manifold 378. The manifold 378 can connect with a plurality of tubes, such as two, three, four, five, or more. In some embodiments, the manifold 378 connects with a tube that carries steam and one or more tubes that carry liquid. For example, the manifold 378 can connect with a steam tube 316a, a milk tube 316b, and a water tube 316c. In some implementations, the steam tube 316a carries a mixture of steam and air. In certain variants, the manifold 378 can connect with a tube or tubes that carry other fluids, such as cold milk, hot milk, cold water, hot water, sauces, syrups, pumped (e.g., pressurized) ambient air, pumped heated air, pumped cooled air, or other fluids.

Each inlet on the manifold 378 can include a backflow prevention feature, such as a check valve. This can enable fluid from each of the tubes to be individually injected through the manifold 378, through the base 336, and into the container 312. In various embodiments, the manifold 378 and/or backflow prevention features can reduce or eliminate the chance of fluid from one tube entering into and/or contaminating the other tubes.

Certain Terminology

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

Summary

Although this disclosure describes certain embodiments and examples of beverage dispensing systems and methods, many aspects of the above-described systems and methods may be combined differently and/or modified to form still further embodiments or acceptable examples. All such modifications and variations are intended to be included herein within the scope of this disclosure. Indeed, a wide variety of designs and approaches are possible and are within the scope of this disclosure. For example, although the dispensing units shown in the figures have one or two dispensing units, certain other embodiments include additional dispensing units. Some embodiments have three, four, five, or more dispensing units, as well as one or more appropriate control and/or selector valves to direct the flow of beverage to the various dispensing units, such as in lieu of or in addition to the three-way control and selector valves shown in FIG. 4. As another example, although the controller is illustrated as having wired connections to other components, in some embodiments, the controller communicates wirelessly with one or more of the components, such as through radio frequency transmissions. As a further example, although some embodiments have discussed cleaning the dispensing unit in the inverted position, some embodiments are configured to clean the dispensing unit in a non-inverted position. For example, cleaning fluid can be introduced into the dispensing unit in the upright position and the dispensing unit can then be rotated to dump the cleaning fluid out of the dispensing unit. As yet another example, while some embodiments described above include a cleaning operation, certain embodiments do not include a cleaning operation. For example, the dispensing unit can be configured such that substantially all of the liquid (e.g., at least 99.99% by volume) is discharged out of the dispensing unit, thereby reducing or eliminating a need to clean the dispensing unit. In some implementations, the dispensing unit includes a surface treatment (e.g., a hydrophobic and/or oleophobic coating) on the inside of the dispensing unit. Furthermore, although some embodiments are described as using steam to heat, aerate, and/or mix the liquid in the container, some embodiments include other heating mechanisms (e.g., electrical resistive heaters, electromagnetic induction coils, or otherwise), other aeration mechanisms (e.g., rotating or vibrating members submerged in the liquid, etc.), and/or other mixing mechanisms (e.g., stirrers, etc.). While illustrative embodiments have been described herein, the scope of all embodiments having equivalent elements, modifications, omissions, combinations (e.g., of aspects across various embodiments), adaptations and/or alterations as would be appreciated by those in the art based on the present disclosure. Additionally, note that this application incorporates by reference the entirety of the U.S. provisional patent application No. 62/220,577, filed Sep. 18, 2015, titled "BEVERAGE PREPARATION SYSTEMS AND METHODS."

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and features are described herein. Not necessarily all such aspects, advantages, and features may be achieved in accordance with any particular embodiment. For example, some embodiments of any of the various disclosed systems include the container and/or include pluralities of the container; some embodiments do not include the container. Those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale where appropriate, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The invention claimed is:

1. A beverage preparation system configured to produce heated aerated liquid, the beverage preparation system comprising: a base comprising a first base port;
a container configured to engage with and disengage from the base, the container comprising an upper end and a lower end, the lower end comprising a first container port with a first check valve, the check valve being configured to automatically close when the container is disengaged from the base; and a tubing assembly connected with the base, the tubing assembly, comprising: tubing that is configured to convey a liquid; a heating unit; and an aeration unit; the beverage preparation system being configured to: heat, with the heating unit, the liquid in the tubing assembly; aerate, with the aeration unit, the liquid in the tubing assembly before or after the liquid is heated by the heating unit; and introduce the heated and aerated liquid from the tubing assembly into the container.

2. The beverage preparation system of claim 1, wherein the base further comprises a second base port and the container further comprises a second container port with a second check valve.

3. The beverage preparation system of claim 1, wherein the heating unit comprises a steam valve configured to permit steam to flow from a steam source into the tubing assembly.

4. The beverage preparation system of claim 1, wherein the heating unit comprises a means for heating.

5. The beverage preparation system of claim 1, wherein the aeration unit comprises an air inlet configured to permit pressurized air to enter the tubing assembly.

6. The beverage preparation system of claim 1, wherein the aeration unit comprises a means for aerating.

7. The beverage preparation system of claim 1, wherein the system is configured to introduce the heated and aerated liquid from the tubing assembly into the interior of the container by passing the heated and aerated liquid through the first base port and the first container port.

8. The beverage preparation system of claim 1, wherein the first check valve comprises a duckbill valve.

9. The beverage preparation system of claim 1, wherein the container and base comprise mating magnetic elements.

10. The beverage preparation system of claim 1, wherein the beverage preparation system is configured to aerate, with the aeration unit, the liquid in the tubing assembly before the liquid is heated by the heating unit.

11. The beverage preparation system of claim 1, wherein the beverage preparation system is configured to aerate, with the aeration unit, the liquid in the tubing assembly after the liquid is heated by the heating unit.

12. A method of preparing heated aerated beverage liquid, the method comprising: conveying a liquid through a tubing assembly; aerating the liquid in the tubing assembly; heating the liquid in the tubing assembly before or after the aerating; conveying the aerated and heated liquid through a passage in a base; conveying the aerated and heated liquid through a first port in a bottom of a container that is positioned on the base; and collecting the aerated and heated liquid in the container.

13. The method of claim 12, wherein aerating the liquid comprises introducing pressurized air into the liquid.

14. The method of claim 12, wherein heating the liquid comprises introducing steam into the liquid.

15. The method of claim 12, wherein aerating the liquid occurs before heating the liquid.

16. The method of claim 12, wherein aerating the liquid occurs after heating the liquid.

17. The method of claim 12, wherein the liquid comprises milk.

18. The method of claim 12, further comprising conveying a flow of cleansing liquid through the tubing assembly.

19. The method of claim 12, further comprising automatically closing a check valve in the container in response to removal of the container from the base.

20. The method of claim 12, further comprising: opening a first check valve in the port in the bottom of the container; and opening a second check valve in a second port in the bottom of the container.

21. The method of claim 12, wherein conveying the aerated and heated liquid through the passage in the base comprises conveying the aerated and heated liquid through the passage in an upward direction.

* * * * *